United States Patent
Miller

[15] 3,691,356
[45] Sept. 12, 1972

[54] SPEED COMMAND AND THROTTLE CONTROL SYSTEM FOR AIRCRAFT

[72] Inventor: Harry Miller, Scottsdale, Ariz.

[73] Assignee: Sperry Rand Corporation

[22] Filed: Dec. 10, 1970

[21] Appl. No.: 96,796

[52] U.S. Cl. ..........235/150.22, 73/178 T, 244/77 D, 244/77 M
[51] Int. Cl. ..........................G06g 7/78, B64c 13/50
[58] Field of Search.............235/150.2, 150.22, 197; 73/178 R, 178 T; 244/77 R, 77 D, 77 M; 340/27 NA

[56] References Cited

UNITED STATES PATENTS

| | | | |
|---|---|---|---|
| 3,522,729 | 8/1970 | Miller | 73/178 R |
| 3,504,335 | 3/1970 | Hall et al. | 73/178 T X |
| 3,455,160 | 7/1969 | Sleight | 73/178 T |
| 3,594,553 | 7/1971 | McElroy | 73/178 T X |
| 3,313,152 | 4/1967 | Kulda et al. | 73/178 T |
| 3,379,396 | 4/1968 | Patterson | 244/77 D |
| 3,458,784 | 7/1969 | Boskovich | 244/77 M X |

Primary Examiner—Malcolm A. Morrison
Assistant Examiner—Jerry Smith
Attorney—S. C. Yeaton

[57] ABSTRACT

Aircraft control apparatus for providing pitch guidance to the pilot during the takeoff acceleration phase between rotation airspeed and steady climbing speed in accordance with Federal Airworthiness Standards for takeoff safety speeds. The steady climbing target speed is determined from computed values of actual coefficient of lift of the aircraft compared to a reference value of coefficient of lift which is programmed in accordance with the number of operating engines, existing thrust to weight ratio, flap position, and leading edge slat extension. The pitch guidance is derived from a control equation which generates a regulating signal for driving the pitch command pointer of an attitude flight director display. Pitch guidance is provided for the pushover acceleration mode during which the aircraft's takeoff flap-slat configuration is retracted and the aircraft is stabilized on a new climb path at a preset airspeed. Pitch guidance is also provided for a missed approach procedure. Further provision is made for the automatic or manual control of engine throttles to maintain an optimum thrust condition or to maintain a pilot set airspeed, including override means whereby a minimum safe speed based on flap position and computed gross weight will override the selected speed if it is below the computed minimum. An additional override is provided to inhibit pilot selection of airspeeds which are above structural limitations of the flaps.

The system requires speed control parameters which are computed by apparatus which provides a measure of the angle of attack and coefficient of lift of an aircraft without external probes or vanes, which measure is derived from computations involving measurements of aircraft longitudinal acceleration, normal acceleration, vertical speed, calibrated airspeed, Mach number, and positions of the movable aerodynamic surfaces which affect the coefficient of lift of an airplane. Supplementary outputs of the computer are signals proportional to acceleration along the flight path, thrust over weight ratio, gross weight of the airplane, potential flight path angle of the airplane, and actual flight path angle.

31 Claims, 15 Drawing Figures

FORCE DIAGRAM IN
AIRCRAFT PLANE
OF SYMMETRY

INVENTOR
HARRY MILLER
BY

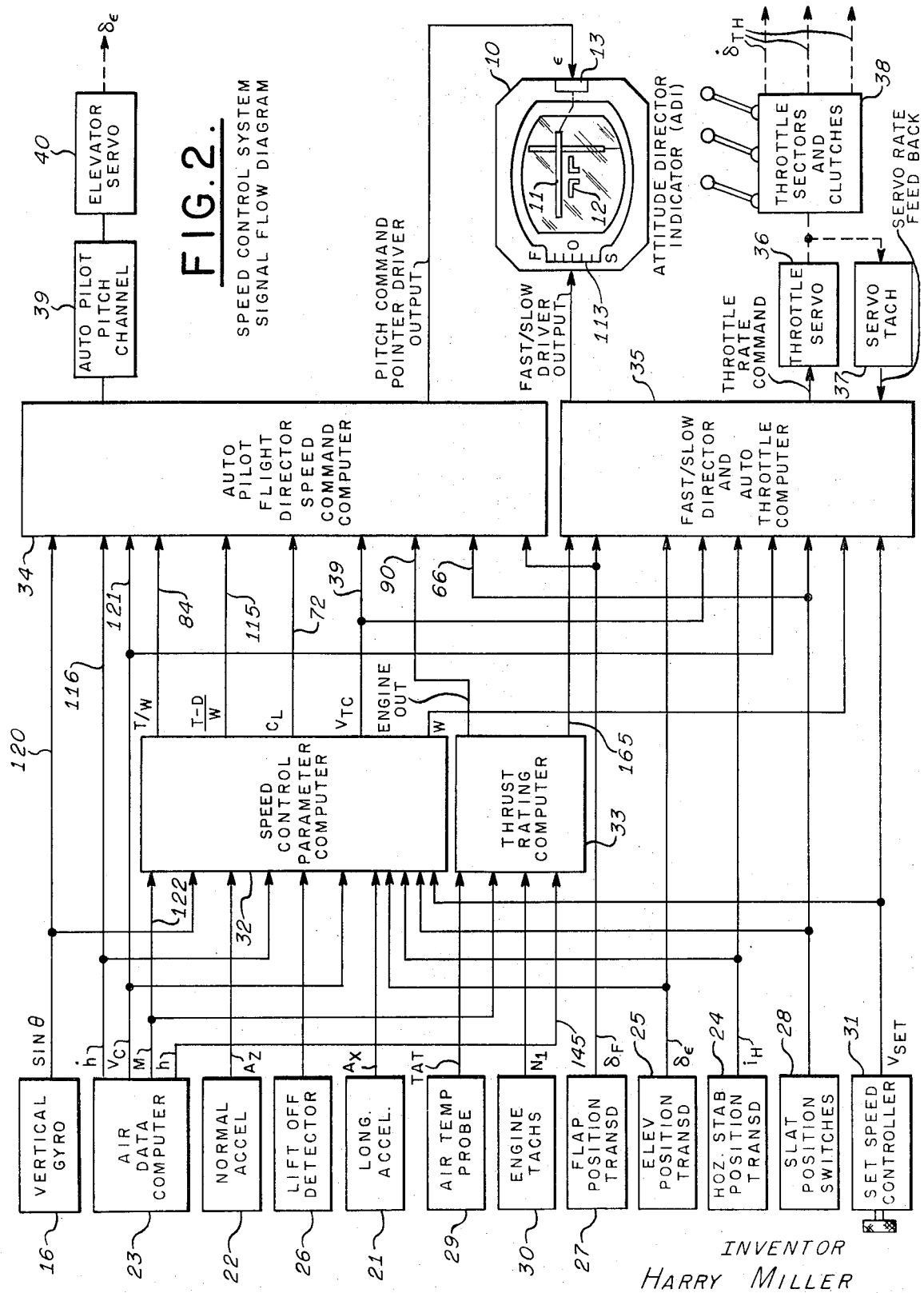

ACCELERATION DIAGRAM
IN AIRCRAFT PLANE
OF SYMMETRY

INVENTOR
HARRY MILLER
BY
*HP Terry*
ATTORNEY

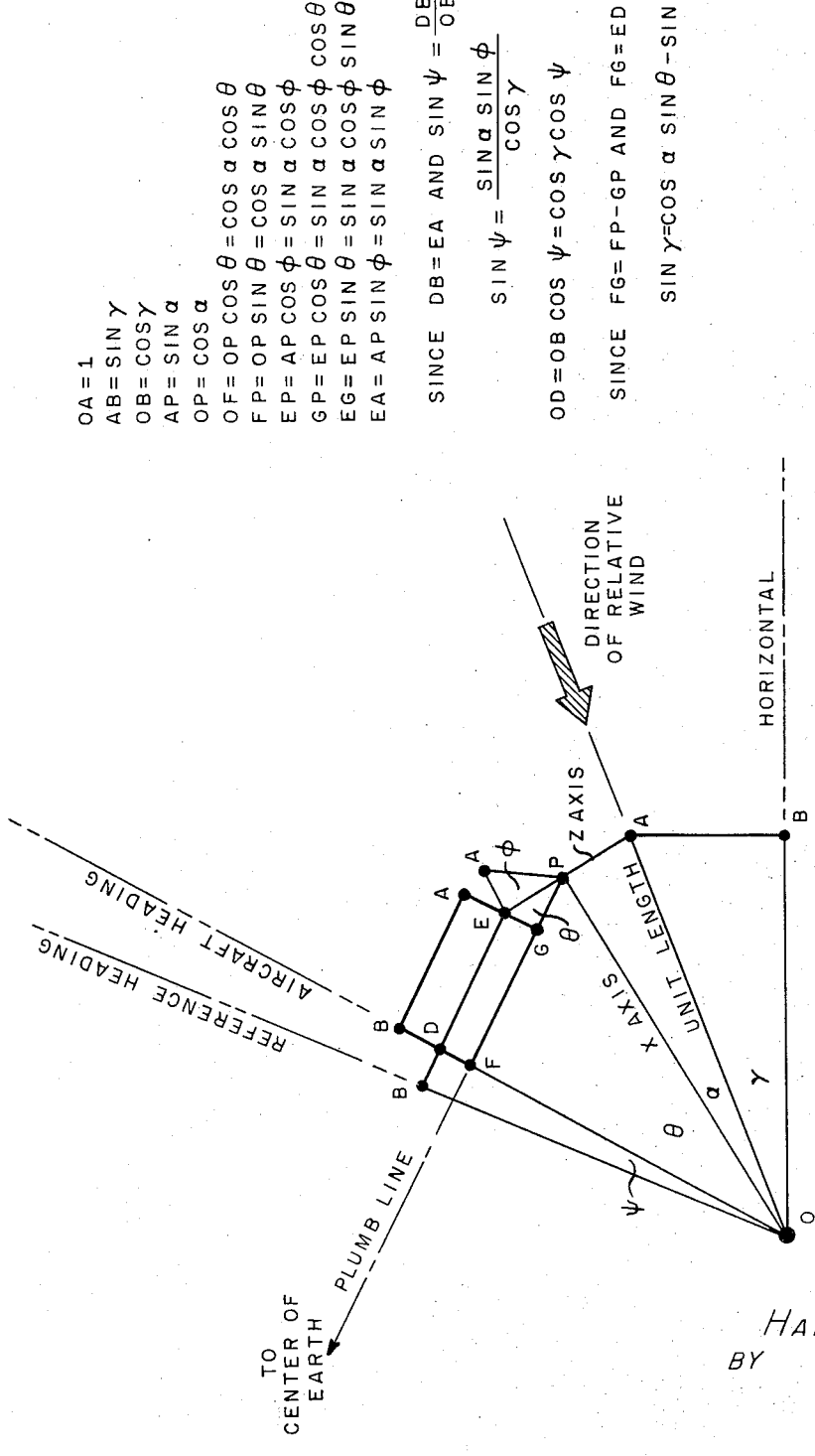

FIG. 7.
FOLD OUT OF POLYHEDRON SHOWING ANGULAR RELATIONSHIPS OF AIRCRAFT REFERENCE FRAME TO EARTH FRAME OF REFERENCE.

$OA = 1$
$AB = \sin \gamma$
$OB = \cos \gamma$
$AP = \sin \alpha$
$OP = \cos \alpha$
$OF = OP \cos \theta = \cos \alpha \cos \theta$
$FP = OP \sin \theta = \cos \alpha \sin \theta$
$EP = AP \cos \phi = \sin \alpha \cos \phi$
$GP = EP \cos \theta = \sin \alpha \cos \phi \cos \theta$
$EG = EP \sin \theta = \sin \alpha \cos \phi \sin \theta$
$EA = AP \sin \phi = \sin \alpha \sin \phi$ SINCE $DB = EA$ AND $\sin \psi = \dfrac{DB}{OB}$ $$\sin \psi = \dfrac{\sin \alpha \sin \phi}{\cos \gamma}$$

$OD = OB \cos \psi = \cos \gamma \cos \psi$

SINCE $FG = FP - GP$ AND $FG = ED = AB$ $\sin \gamma = \cos \alpha \sin \theta - \sin \alpha \cos \phi \cos \theta$ INVENTOR
HARRY MILLER
BY
*HP Jerry*
ATTORNEY

ANGLE OF ATTACK COMPUTER

PROGRAM

INVENTOR
HARRY MILLER

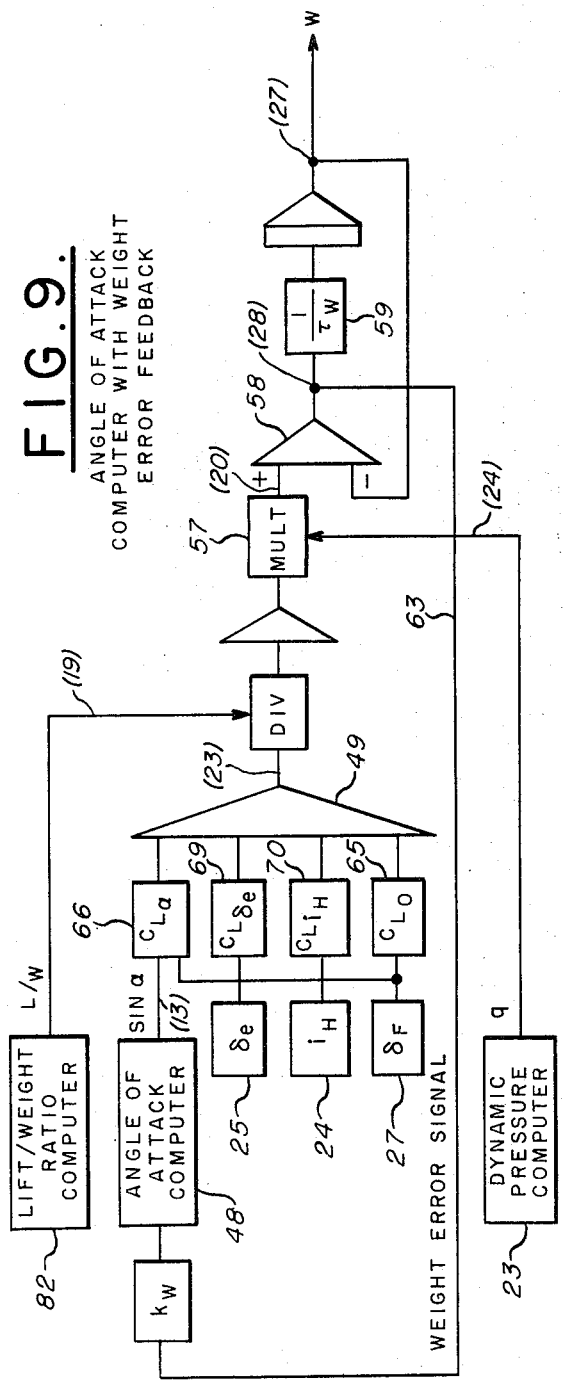
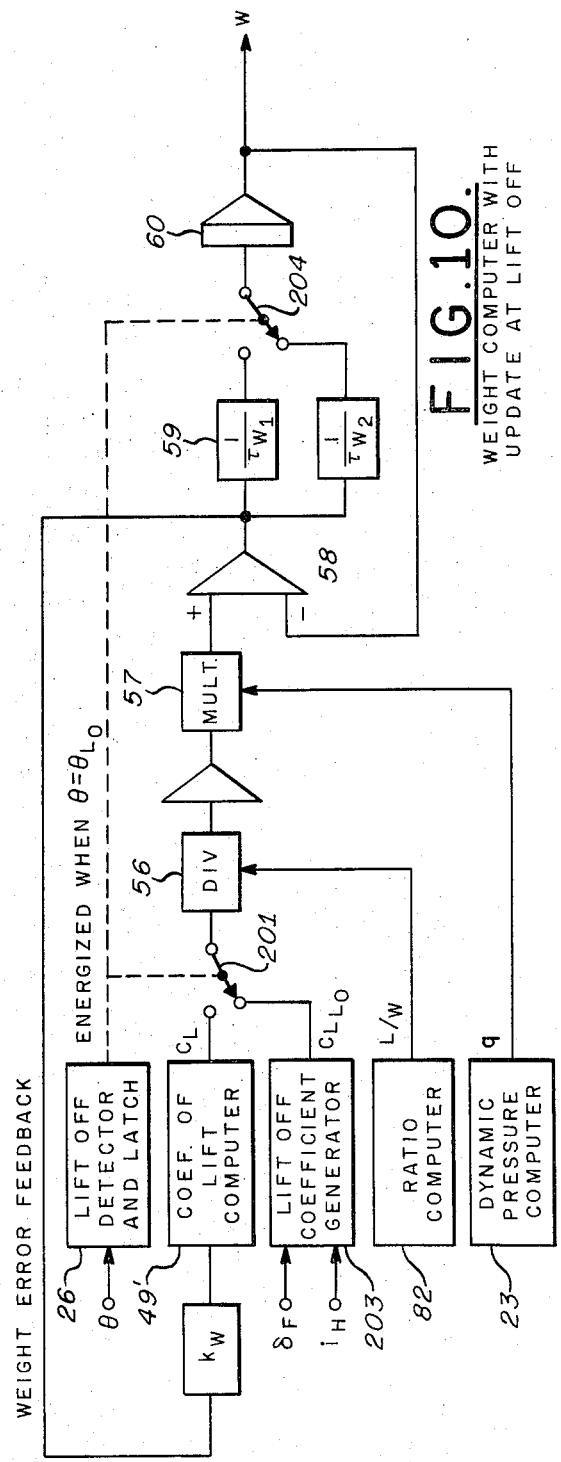

SPEED CONTROL PARAMETER COMPUTER

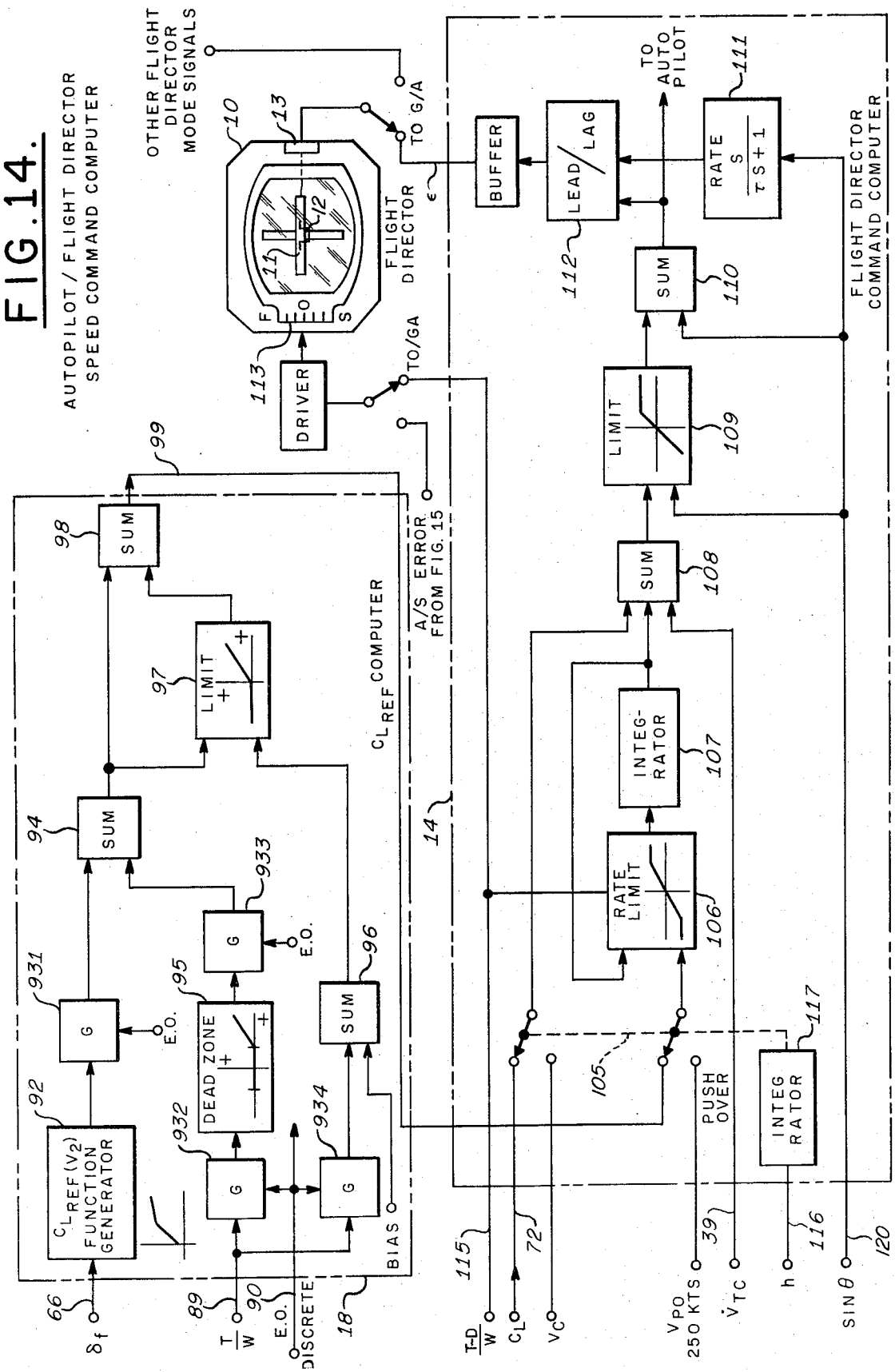

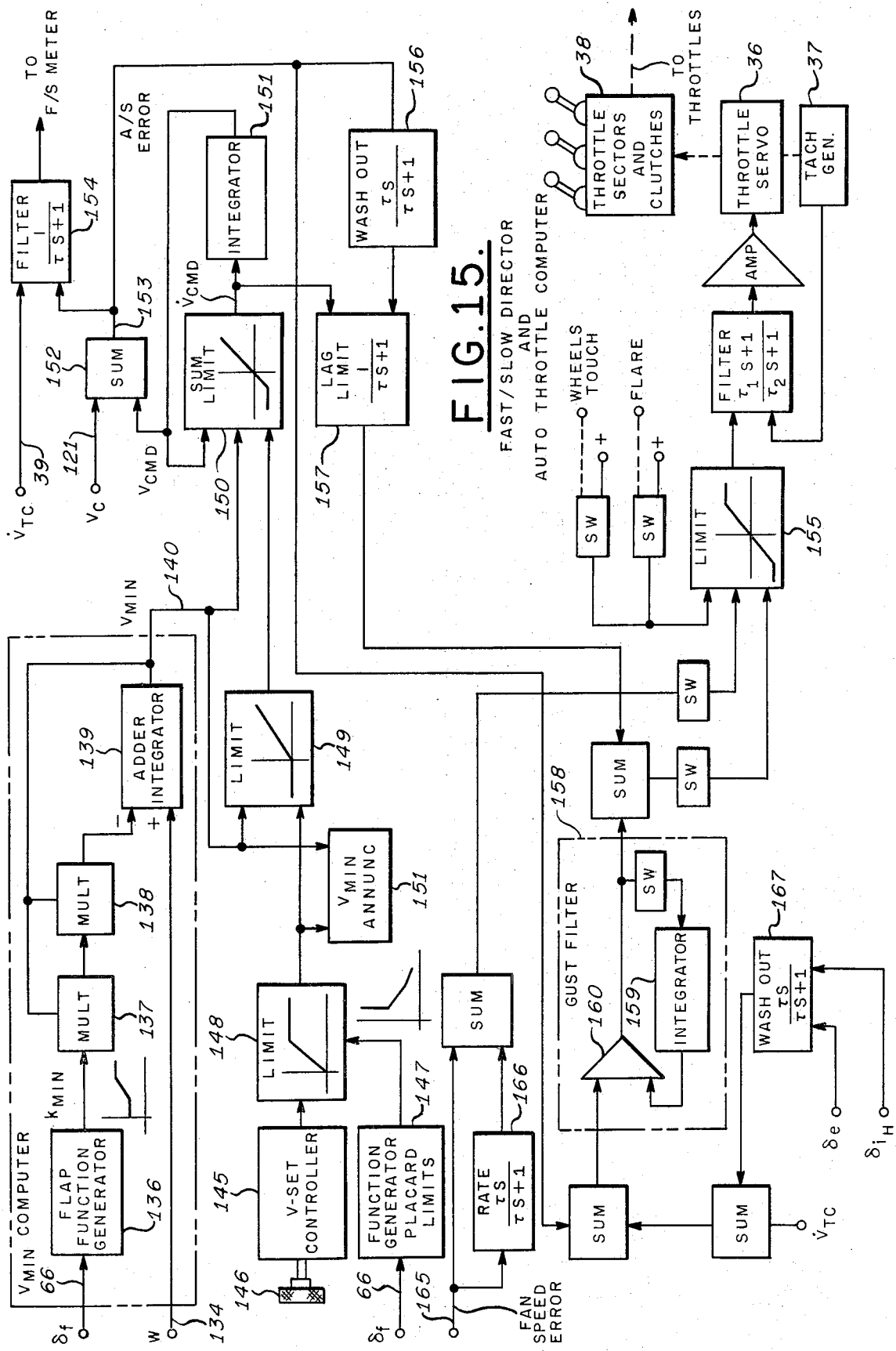
FIG.15. FAST/SLOW DIRECTOR AND AUTO THROTTLE COMPUTER

SPEED COMMAND AND THROTTLE CONTROL SYSTEM FOR AIRCRAFT

CROSS-REFERENCE TO RELATED APPLICATIONS AND PATENTS

The apparatus of the present invention is in general related to Applicant's U.S. Pat. No. 3,522,729 entitled Airspeed Command System and assigned to the same assignee as the present invention. The apparatus of the present invention requires in its various computations, signals proportional to angle of attack, coefficient of lift, acceleration along the flight path, thrust over weight ratio, gross weight of the aircraft, and potential flight path of the airplane.

The angle of attack signal may be computed in accordance with the teachings of Applicant's copending application Ser. No. 873,044, filed Oct. 29, 1969, entitled Angle of Attack Computer and also assigned to the same assignee and now abandoned. Alternatively, the angle of attack computer may be computed in accordance with the teachings of application Ser. No. 873,287, filed Oct. 31, 1969 in the name of J. Dendy et al., entitled Angle of Attack Computer and assigned to the same assignee as the present invention.

A further novel embodiment for generating the angle of attack signal and other required speed control parameters is described in this disclosure under the title "Computer for Speed Control Parameters." The preferred computer achieves greater accuracy during accelerated flight and in the presence of wind and wind shear conditions. The preferred computer also achieves greater accuracy during the take-off run when the aircraft is under the influence of ground effect. Corrections involving effects of bank turns are also disclosed.

The elevator maneuver guidance may be provided by a flight director type of instrument of the general characteristics disclosed in the present inventor's assignee's U.S. Pat. Nos. 2,613,350 and 2,613,352 wherein a single vertically movable horizontal pointer is displaced by a computed pitch command signal, such that the pilot, by maintaining the pointer zeroed on its reference index through elevator control, causes the craft to approach and maintain a prescribed flight path.

The flight director pointer may be driven by a meter movement of the type disclosed in Applicant's assignee's copending patent application Ser. No. 815,933, now U.S. Pat. No. 3,577,195, filed Apr. 14, 1969 in the name of C. E. Clift and entitled Servoed Meter Apparatus.

The automatic throttle control may be of the type disclosed in the inventor's assignee's U.S. Pat. Nos. 2,626,767 and 2,948,496. The dual servo concepts of the Applicant's U.S. Pat. No. 3,504,248 for fail-operational control, and the clutch concepts of the Applicant's U.S. Pat. No. 3,505,912 are applicable to the over-all speed control system of this disclosure. These patents are assigned to the assignee of the present application.

BACKGROUND OF THE INVENTION

The present invention relates to an aircraft closed loop speed control system of the general type shown in FIG. 1 whereby the controls of the aircraft which determine the speed of the airplane are manipulated in a manner to achieve a desired set of aircraft environmental conditions. As is typical in closed loop systems, it is necessary to measure environmental conditions by applicable sensors, process the electrical outputs of the sensors and convert them to a form which enables them to be compared to the desired set of conditions. The deviation signals are used either to operate a guidance display for the pilot or, alternatively, to drive suitable servoes which operate the aircraft controls automatically. The apparatus of the present invention includes the electrical subsystem of a closed loop over-all aircraft control system shown schematically in FIG. 1, including the sensors, processing circuitry, flight director displays, and servoes which operate the elevator and throttle controls of the aircraft, which in turn move the aircraft to effect the sensors thereby closing the loop.

The apparatus between the input and output interfaces indicated in FIG. 1 controls the speed of the airplane during its entire vertical flight profile including take-off, push-over, climb-to-cruise-altitude, cruise, let-down, approach and landing, or go-around. More specifically, the system provides take-off (and go-around) guidance whereby the pilot is commanded to manipulate the elevator controls of the aircraft in a prescribed manner consistent with Federal Airworthiness Standards for take-off safety speed.

Criteria for the critical take-off and landing maneuvers of commercial jet transports are carefully regulated by the Airworthiness Standards of the Federal Aviation Agency. The basic criteria for the take-off maneuver are expressed as airspeeds designated $V_1$, $V_R$ and $V_2$, which airspeeds are determined by the pilot from data published in the handbook prepared by the designer of the particular aircraft. These airspeeds are such that prescribed minimum margins above stall will exist when the aircraft is airborne under the most critical position of the center of gravity. The aircraft must attain the minimum safety take-off speed ($V_2$) before the end of the runway is reached. While it is acceptable to fly above the minimum speeds, a constraint exists because of required runway length. The federal standards require runway lengths such that the airplane will clear the end of the runway by at least 35 feet under a condition where the most critical engine has failed. In order to meet these requirements the FAA approved flight manual is based on control to $V_2$ speed under a failed engine condition and $V_2 + 10$ knots when all engines are operating normally.

$V_1$ is the refusal airspeed. If an engine fails prior to $V_1$, the take-off must be aborted because the aircraft does not have sufficient ground directional stability at speeds less than $V_1$ to counteract the yawing moment caused by failure of an outboard engine and therefore all engines must be shut down to remove the moment. Runway lengths are based on stopping the aircraft at a maximum speed of $V_1$. If an engine fails after $V_1$ is reached, the take-off must be continued since there will not be sufficient runway left to stop the aircraft. The regulations require sufficient failed-engine performance so that the aircraft will attain $V_2$ speed prior to the end of the runway, clear the end of the runway by at least 35 feet, and have a prescribed minimum steady state climb gradient at $V_2$ speed.

$V_R$ is the rotation airspeed, at which speed the nose of the aircraft is rotated up by elevator deflection in preparation of lift off which normally occurs several seconds after rotation. The $V_R$ speed is based on a stall margin which is somewhat less than the $V_2$ speed. The regulations also require that $V_R$ be at least 5 percent greater than minimum control speed in the air ($V_{MCA}$). The minimum control speed is dictated by directional control capability in the event of an outboard engine failure.

The rotation maneuver results in a coefficient of lift which is momentarily greater than the steady state value that will be obtained when the aircraft is climbing steadily at target airspeed ($V_2$ or $V_2 + 10$ knots, depending on number of operating engines). The momentary overshoot is required in order to get the aircraft airborne rapidly and thus minimize the length of runway required to attain target speed. The amount of the overshoot should be proportional to the acceleration existing at the time of rotation; that is, the overshoot will be small when the airplane weight is high and thrust is low, the overshoot will be high when weight is low and thrust is high. As a consequence of this the target value of coefficient of lift ( $C_{L_{RJ}}$ ) is required to be decreased when the thrust to weight ratio is high in order to keep the momentary value of coefficient of lift from exceeding a value which approaches too close to the stall value.

$V_2$ is the speed which a failed-engine aircraft must attain at the runway fence, i.e., 35 feet above the end of the runway. Airworthiness Standards for $V_2$ vary with aircraft type. For example, for a three engine aircraft, $V_2$ cannot be less than 120 percent of the stall speed, $V_S$, while for a four engine aircraft $V_2$ cannot be less than 115 percent of $V_S$. In any event, $V_2$ cannot be less than 110 percent of $V_{MCA}$.

Thus, the take-off elevator or pitch maneuver is primarily a speed control problem. The sequence begins at the start of the take-off roll and terminates usually not more than 5 minutes thereafter. Aircraft jet engines are designed to deliver take-off power for only a fixed period of time and by the end of this time period the aircraft must be in its clean configuration (wheels, flaps, slats, etc. retracted) so that engines can be throttled back to normal climb-to-cruise thrust rating. Federal regulations restrict climb-to-cruise speeds to no greater than 250 knots when flying at altitudes below 10,000 feet.

The inventor is unaware of any prior speed control system which, particularly during the take-off and go-around maneuver, provides guidance fully consistent with the requirements of Federal Airworthiness Standards. Prior art apparatus has been employed in the past purportedly to assist the pilot during the critical take-off and go-around maneuver, but insofar as the inventor is aware, this apparatus does not take into consideration all of the constraints imposed by the Airworthiness Standards.

The present invention, as will become apparent, is entirely different in kind and function from any prior art of which the inventor is aware and embodies an entirely different basic philosophy.

SUMMARY OF THE INVENTION

This invention produces automatically sequenced elevator control commands during the take-off and climb out maneuver which includes rotation, lift-off and acceleration to target safety speed, pushover acceleration to flap retraction speed, and acceleration to climbout speed. The invention also produces throttle rate commands during climb-to-cruise, cruise, letdown, approach, landing flare, and touchdown. The invention further produces a combined elevator control command and throttle rate command for the missed approach procedure.

BRIEF DESCRIPTION OF THE DRAWINGS

Preferred embodiments of the present invention are described and illustrated in the attached drawings, wherein:

FIG. 2 is a basic block diagram of the electrical subsystem illustrated in FIG. 1;

FIGS. 3, 4, 5, 6 and 7 are diagrams useful in understanding the invention and especially useful in illustrating the derivation of the mathematical relationship upon which the apparatus of the present invention is based;

FIG. 9 is a simplified block diagram of the angle of attack computer employing a weight error feedback term;

FIG. 10 is a simplified block diagram of the weight computer embodied in the present invention;

FIG. 14 is a block diagram of the autopilot and flight director speed command computer; and FIG. 15 is a block diagram of the fast/slow director and autothrottle computer.

DESCRIPTION OF THE PREFERRED EMBODIMENTS

Figure 1:
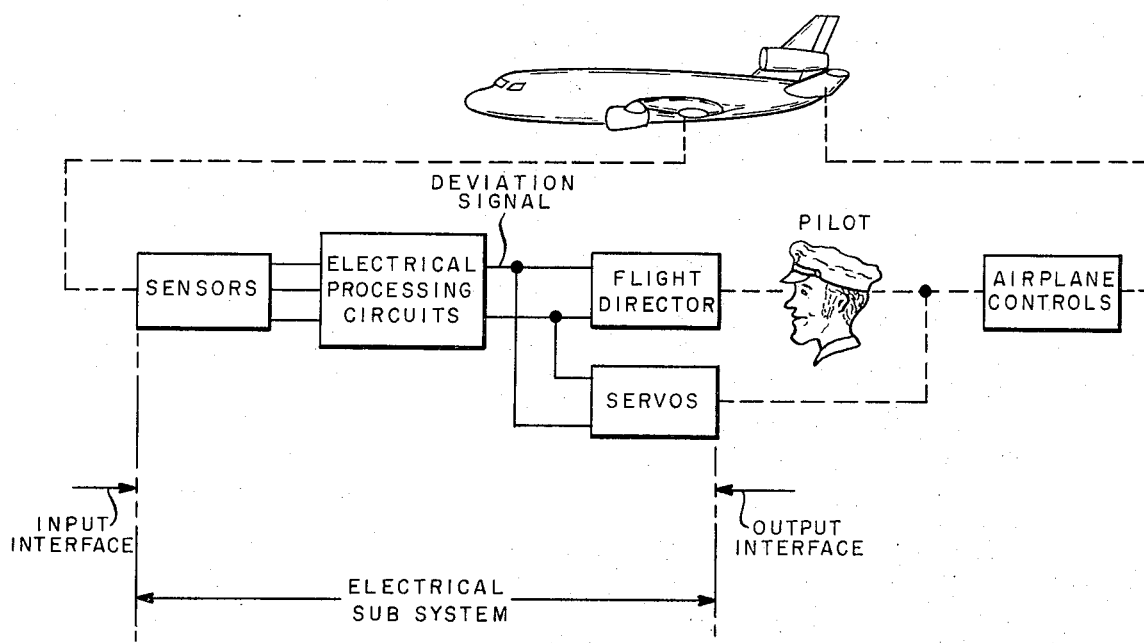
FIG. 1 is an over-all block diagram of the outer or aircraft closed loop speed control system of the present invention and is included for background understanding.

Referring now to the drawings, a block diagram of the over-all system of the present invention is shown in FIG. 2. This equipment corresponds to the "Electrical Subsystem" of FIG. 1, comprising sensors, signal processing circuitry, and utilization equipment.

The system sensors are shown on the left in FIG. 2. The sensors form the input interface between the electrical subsystem and the aircraft environment. They consist of a vertical gyro 16 with a signal output 120 designated sine $\theta$ (pitch); pitot/static pressure sensors which are included in and utilized by an air data computer 23 to provide output signals 116, 121, 122, 145 proportional to vertical speed ($\dot{h}$), calibrated airspeed ($V_c$), Mach number (M), an altitude ($h$), respectively; normal accelerometer 22 providing norm acceleration signal ($A_Z$); lift off detector 26 which may be a switch which is actuated at a predetermined time during the ground roll, preferably at a predetermined pitch attitude after $V_R$, or when the aircraft landing gear is relieved of load; longitudinal accelerometer 21 providing a longitudinal acceleration signal ($A_X$); air temperature probe 29; engine fan speed tachometers 30; flap position transducer 27 ($\delta_F$); elevator position transducer 25 ($\delta_E$); horizontal stabilizer position transducer 24 ($_H$); slat position switches 28 which are actuated when the leading edge slats are in retracted position, take-off position, and landing position; and a pilot selectable speed counter or controller 31 ($V_{SET}$).

The signal processing circuitry is subdivided into four major computer groups as shown in FIG. 2; a speed control parameter computer 32, a thrust rating computer 33, autopilot/flight director speed command computer 34, and a fast/slow director and throttle computer 35. These computers receive the sensor signals directly and process them to derive intermediate signals which are further conditioned and processed by the two output computers which, in turn, are used to drive the utilization equipment.

The utilization equipment forms the output interface between the electrical subsystem and the aircraft's elevator and throttle control mechanisms. Each output computer drives two utilization devices. The autopilot/flight director speed command computer 34 has an output which operates the aircraft's elevator through the autopilot pitch channel 39 and elevator servo 40. It also has an output which drives the horizontal flight director pointer 11 of the attitude director indicator 10 (ADI). The fast/slow director and autothrottle computer 35 has an output which operates the fast-slow display 113 that is typically at the left side of the ADI. This computer also has an output which drives the throttles through a throttle servo 36 and clutch pack 38. A tachometer 37 feedback from the throttle servo results in a closed loop response to the throttle rate command signal.

SPEED CONTROL PARAMETER COMPUTER

The speed control parameter computer 32 involves the forces and accelerations acting at the center of mass of an airplane in maneuvering flight. FIGS. 3 through 7 illustrate the geometric orientation of the applicable accelerations and forces. These figures are used to derive the fundamental mathematical relationships which form the basis for the implementation of the preferred speed control parameter computer.

Figure 3:
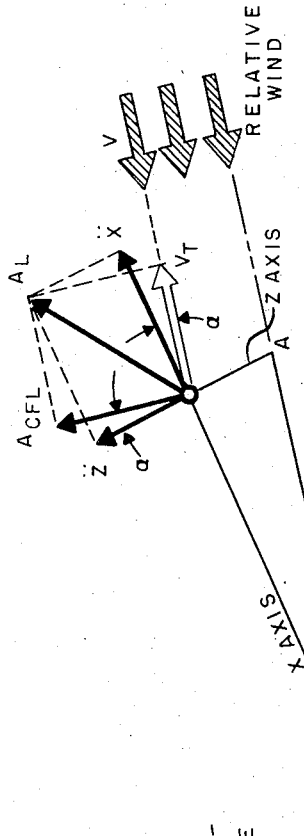
Figure 4:
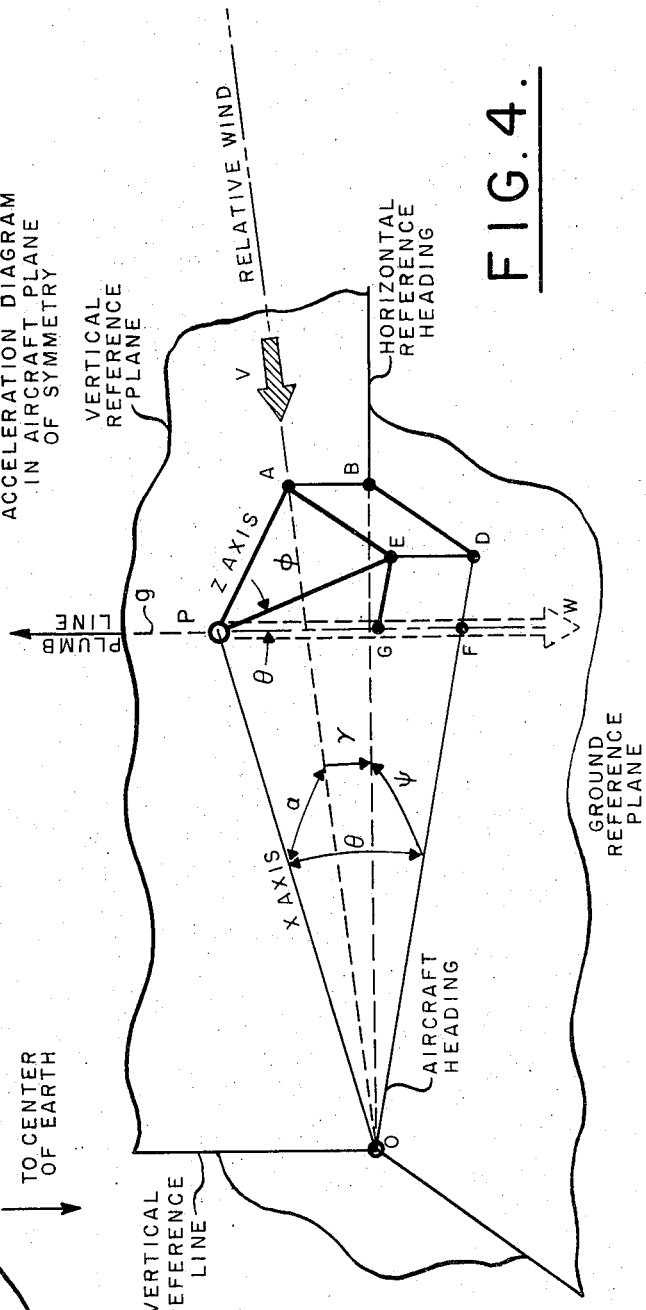

FIG. 3 illustrates aircraft conditions during level flight; FIG. 4 illustrates conditions during bank turns. In both FIGS. 3 and 4 the plane of symmetry of the airplane is that which contains the triangle OPA. The point P is at the center of mass of the airplane. The line OP is a longitudinal reference line that is fixed to the airplane and is designated the X-axis. The point O represents the intersection of the X-axis with the ground reference plane, which plane is orthogonal to a plumb line extending from the airplane's center of mass (P) to the center of the earth.

The X and Z axes of the airplane are located in the plane of symmetry of the aircraft. The Z axis extends through the center of mass (P) and is orthogonal to the X-axis. A third reference line is designated the Y-axis. It also extends through the center of mass, forming with the X and Z axes a three dimensional mutually orthogonal frame of reference that is fixed to the airplane.

The vertical reference plane shown in FIGS. 3 and 4 is a plane that goes through point O, is orthogonal to the ground plane and, in addition, contains a line that is parallel to the direction of the relative wind. The angle between the direction of the relative wind and the X-axis of the airplane is the angle of attack of the airplane, designated $\alpha$. The angle between the direction of the relative wind and the ground plane is the flight path angle of the airplane, designated $\gamma$. The angle between the X-axis of the airplane and the ground plane is the pitch angle of the airplane, designated $\theta$. The pitch angle and flight path angle are measured in vertical planes which are orthogonal to the ground plane.

During wings-level flight (FIG. 3) the plane of symmetry is coincident with the vertical reference plane. Since the pitch angle and flight path angle are measured in the same plane, the pitch angle equals the sum of angle of attack and flight path angle; that is:

$$\theta = \alpha + \gamma \qquad (1)$$

During turning flight (FIG. 4), the plane of symmetry (defined by the triangle O-P-A) is not coincident with the vertical plane which contains the direction of the relative wind. Under these conditions, the pitch angle and flight path angle are not measured in the same plane and equation (1) does not hold. The flight path angle is measured in the plane which contains triangle O-A-B while the pitch angle is measured in the plane which contains the quadrangle O-P-E-D.

The angle designated as $\Phi$ in FIG. 4 is the aircraft bank angle. The bank angle can be measured by the outer gimbal structure of a vertical gyroscope whose spin axis is slaved to be aligned with a plumb line which extends from the center of mass (P) to the center of the earth. This plumb line intersects the ground reference plane at point F in FIGS. 3 and 4. The angle $\Phi$ is the angle between the Z axis of the airplane and a line in the vertical pitch angle plane which is perpendicular to the X axis of the airplane.

It is helpful in determining the orientation of the various angles of FIG. 4 to consider the lines of FIG. 4 as the edges of a six sided polyhedron, each side of which is a right triangle or a rectangle. The fold out of these sides is illustrated in FIG. 7. The letters defining points of the several triangles correspond to those shown in FIG. 4. The mathematical derivations shown in FIG. 7 prove that the general expression which relates pitch angle, angle of attack, and flight path angle is:

$$\sin \gamma = \cos \alpha \sin \theta - \sin \alpha \cos \Phi \cos \theta \qquad (2)$$

Figure 6:
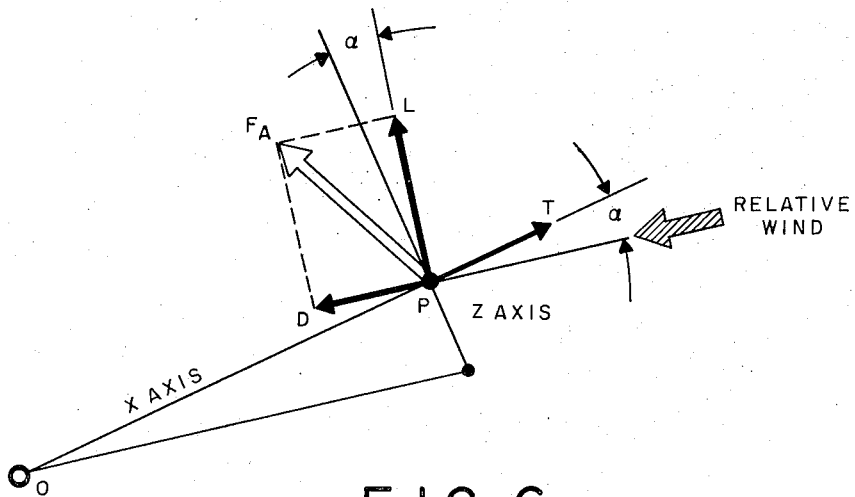
Figure 5:
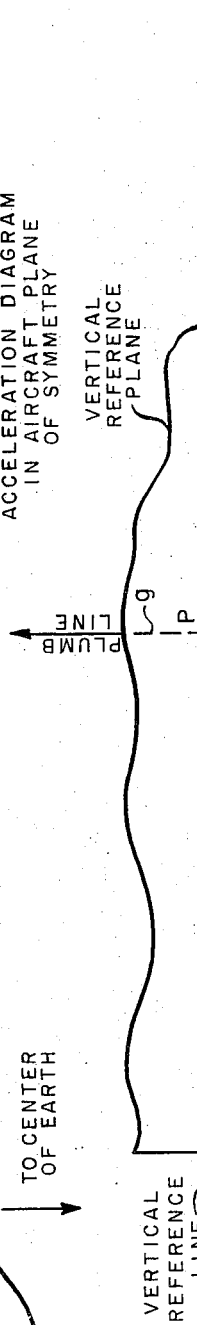

FIGS. 5 and 6 are concerned with forces and accelerations in the aircraft plane of symmetry which contains the X and Z axes (plane defined by triangle O-P-A).

The flow of air passing the aircraft will generate an aerodynamic force on the aircraft. This is shown as an open arrow ($F_A$) in FIG. 6. For convenience, this force is resolved into two components, designated drag and lift. The drag component (D) is along the flight path of the airplane (along the direction of the relative wind). The lift component (L) is at right angles to the flight path.

The thrust due to the engines is in a forward direction along the X axis of the airplane. It is designated T in FIG. 6. The vector sum of thrust, drag, and lift will form a resultant force which is used to balance the gravity attraction of the earth, with any excess causing aircraft acceleration.

A total acceleration ($A_P$) exists at the center of mass of the airplane. The time history of the magnitude and direction of the total acceleration vector will determine the flight path of the airplane. It is convenient to resolve the total acceleration vector into three mutually orthogonal components. These are along the X, Y, and Z axes, designated $\ddot{X}$, $\ddot{Y}$ and $\ddot{Z}$, respectively. The components in the plane of symmetry are $\ddot{X}$ and $\ddot{Z}$. These can be combined to form the longitudinal acceleration vector, designated $A_L$. The vector components in the plane of symmetry are shown in FIG. 5.

The total longitudinal acceleration vector ($A_L$) can also be resolved into a second pair of mutually orthogonal components; one along the flight path and one at right angles to the flight path. These components are designated $\dot{V}_T$ and $A_{CFL}$ in FIG. 5. For purposes of the present invention, it will be assumed that the relative wind impinges on the aircraft essentially along its plane of symmetry. This will be true if the aircraft is not in a sideslip condition; that is, if the airplane is operating with negligible rudder deflection. Under these conditions, $\dot{V}_T$ as shown in FIG. 5, represents the acceleration along the flight path. The components $A_{CFL}$ and $\ddot{Y}$ can be combined by vector addition. The resultant will be the centrifugal acceleration on the aircraft, arising because the airplane mass is moving along a curved path.

Linear accelerometers, which are strapped to the aircraft X, Y, and Z axes, can be used to measure the accelerations. If it is assumed that the aircraft operates with small sideslip angles, it is only necessary to consider the accelerations along the X and Z axes. The relationships can be summarized as follows:

$$\dot{V}_T = \ddot{X} \cos \alpha - \ddot{Z} \sin \alpha \qquad (3)$$

$$A_{CFL} = \ddot{X} \sin \alpha + \ddot{Z} \cos \alpha \qquad (4)$$

The outputs of linear accelerometers that are strapped to the X and Z axes contain spurious signals because they are affected by the gravitational field of the earth. This effect can be analyzed by replacing the gravitational field of the earth with an equivalent value of acceleration. This is shown as an upward arrow from point P in FIG. 4 and is designated $g$. If the gravitational field of the earth were removed the mass of the airplane would be subjected to a force (W) along the plumb line, exactly equivalent to that existing when the earth's gravitation field was present.

The accelerometers cannot differentiate between the equivalent acceleration of the earth's gravitational field and the $\ddot{X}$ and $\ddot{Z}$ acceleration components. The effects can be compensated, however, because the value of $g$ is accurately known as is its direction (along a plumb line). All that is necessary is to resolve the $g$ acceleration along the particular axis of interest. From FIG. 4, the spurious component along the X axis is $g \sin \theta$; along the Z axis it is $g \cos \theta \cos \Phi$; along the Y axis it is $g \cos \theta \sin \Phi$; along the flight path it is $g \sin \gamma$. The signal outputs of the accelerometers are designated $A_X$ and $A_Z$:

$$A_X = \ddot{X} + g \sin \theta \qquad (5)$$

$$A_Z = \ddot{Z} + g \cos \theta \cos \Phi \qquad (6)$$

Equations (3) and (4) can accordingly be expressed:

$$\dot{V}_T = (A_X - g \sin \theta) \cos \alpha - (A_Z - g \cos \theta \cos \Phi) \sin \alpha \qquad (7)$$

$$A_{CFL} = (A_X - g \sin \theta) \sin \alpha + (A_Z - g \cos \theta \cos \Phi) \cos \alpha \qquad (8)$$

The acceleration along the flight path is proportional to the resultant of forces which act along the flight path. These include contributions from thrust, drag, and weight. The lift component (being orthogonal to the flight path) does not contribute force in the direction of flight. Referring to FIG. 4, the component of weight along the flight path is $W \sin \gamma$. The net force along the flight path is proportional to flight path acceleration:

$$W/g (\dot{V}_T) = T \cos \alpha - D - W \sin \gamma \qquad (9)$$

This can also be written as:

$$\frac{T \cos \alpha - D}{W} = \frac{\dot{V}_T}{g} + \sin \gamma \qquad (10)$$

Combining equations (2), (7), and (9) and simplifying the result is the following relationship:

$$\frac{T \cos \alpha - D}{W} = \frac{A_X \cos \alpha - A_Z \sin \alpha}{g} \qquad (11)$$

Equating equations (10) and (11):

$$\frac{\dot{V}_T}{g} + \sin \gamma = \frac{A_X \cos \alpha - A_Z \sin \alpha}{g} \qquad (12)$$

Equation (12) is the basis for the angle of attack computer implementation of the present invention and for this purpose it is written in the form:

$$\sin \alpha = \frac{A_X \cos \alpha - \dot{V}_T - g \sin \gamma}{A_Z} \qquad (13)$$

The flight path angle can be expressed as:

$$\sin \gamma = \dot{h}/V \qquad (14)$$

where $\dot{h}$ is aircraft vertical speed and $V$ is velocity along the flight path.

The basic concept of the angle of attack computer implementation of the present invention is that the gross weight of the aircraft varies very slowly during flight, representing only burn off of fuel. Thus, in accordance with the present invention, this fact is used as a check on the accuracy of the angle of attack computer by using the computed data to derive a measure of the gross weight. If the weight measure varies rapidly, it is indicative of inaccuracy in the initial computation. The rate of change of the weight computation is accordingly used in a feedback configuration to correct the computations as will be more fully described below.

The computation of gross weight involves the forces and accelerations along the Z axis of the airplane. From FIGS. 5 and 6:

$$W/g \ddot{Z} = L \cos \alpha + D \sin \alpha - W \cos \theta \cos \Phi \qquad (15)$$

Substitution of equation (6) into (15) results in the following expression:

$$\frac{L \cos \alpha + D \sin \alpha}{W} = \frac{A_Z}{g} \qquad (16)$$

Lift and drag are conventionally expressed:

$$L = C_L q S \qquad (17)$$

$$D = C_D q S \qquad (18)$$

where:
S is wing area
q is dynamic pressure $C_L$ is coefficient of lift
$C_D$ is coefficient of drag Substitution of equations (17) and (18) into (16) results in the following expression for lift over weight ratio:

$$\frac{L}{W} = \frac{A_Z}{g} \left[ \frac{1}{\frac{C_D}{C_L} \sin \alpha + \cos \alpha} \right] \quad (19)$$

The computed gross weight is:

$$W_C = \frac{L}{L/W} = \frac{C_{L\alpha} S}{L/W} \quad (20)$$

The thrust to weight ratio can also be determined by relationships (11), (17) and (18):

$$\frac{T}{W} = \frac{1}{\cos \alpha} \left[ \frac{A_X \cos \alpha - A_Z \sin \alpha}{g} + \frac{C_D}{C_L} \frac{L}{W} \right] \quad (21)$$

The speed control parameter computer 32 is a mechanization of equations (13) through (21). An exact implementation for equation (13) requires measures of longitudinal acceleration ($A_X$), normal acceleration ($A_Z$), flight path acceleration ($\dot{V}_T$), and flight path angle ($\sin \gamma$).

Figure 8:
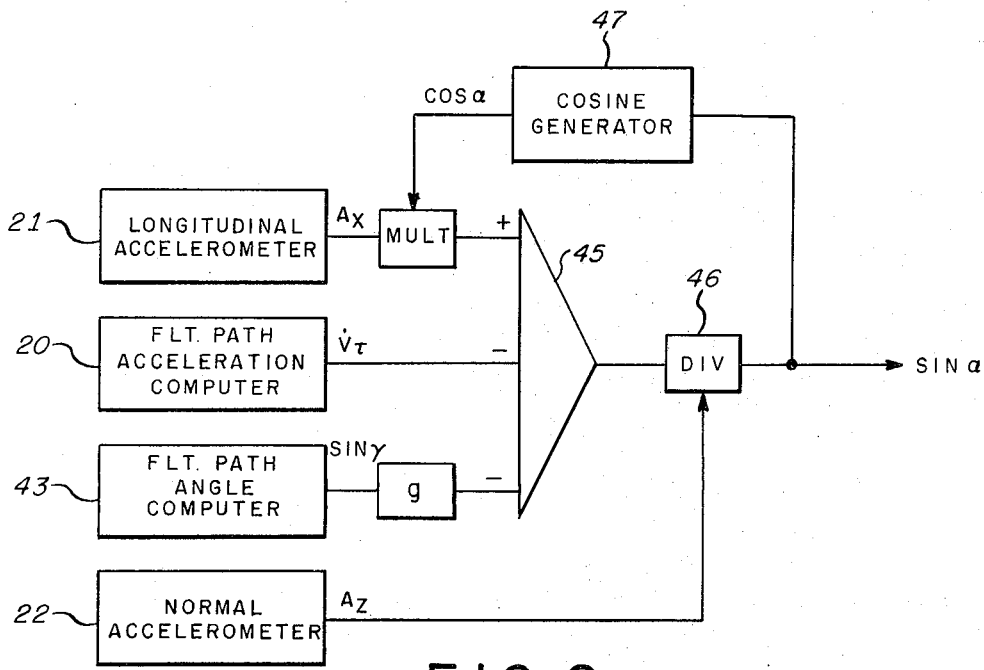
FIG. 8 is a simplifed block diagram of an angle of attack computer.

FIG. 8 is a simplified schematic of apparatus for performing this computation wherein the sensor signal sources for the longitudinal and normal acceleration terms ($A_X$ and $A_Z$) are the longitudinal and vertical accelerometers 21 and 22, respectively, while the signal sources for the flight path acceleration and flight path angle terms ($\dot{V}_T$ and $\sin \gamma$) are supplied by sub computation networks 20 and 43 respectively. As required by equation (13) the longitudinal acceleration, flight path acceleration, and flight path angle signals are supplied to a summing amplifier 45 in the senses indicated, the output of which is divided by the normal acceleration signal by conventional divider network 46. The multiplication of the longitudinal acceleration signal by $\cos \alpha$ is obtained by a feedback path through conventional cosine generator 47. The cosine generator is based on the trigonometric relation:

$$\cos \alpha = \sqrt{1 - \sin^2 \alpha} \quad (22)$$

The implementation shown in FIG. 8 presents several computation problems which will be discussed later as the description proceeds. Assume for the moment, however, that these problems are solved in a practical manner and that the entire configuration of FIG. 8 is replaced with an equivalent box which has an electrical output signal proportional to sine $\alpha$, as is indicated at 48 in the angle of attack computer arrangement of FIG. 9. The numbers in parentheses in FIG. 9 represent signals proportional to electrical quantities in accordance with corresponding equations in this specification.

The $\sin \alpha$ signal is combined in summing amplifier 49 with signals proportional to elevator deflection ($\delta_E$) from sensor 25, horizontal stabilizer position ($i_H$) for sensor 24, and flap position from sensor 27 to derive a signal proportional to the steady state coefficient of lift of the airplane. Thus, the output of sum amplifier 49 represents a solution of the following equation:

$$C_L = C_{L_0} + C_{L_\alpha} \sin \alpha + C_{L_{\delta_E}} \delta_E + C_{L_{i_H}} i_H \quad (23)$$

For a particular airplane $C_{L_0}$ is a function of flap position, slat position, and Mach number. $C_{L_\alpha}$ is a function of flap position, Mach number, and angle of attack.

$$C_{L_{\delta_E}} \text{ and } C_{L_{i_H}}$$

are functions of Mach number. The blocks 65, 66, 69 and 70 designated by these quantities respectively in FIG. 9 represent conventional function generators which convert the variables to a form which matches the known steady state characteristics of a particular airplane.

The lift over weight ratio computer 82 may be apparatus to perform an exact computation of equation (19) but it will be shown below how the requirements of the solution may be relaxed by use of the weight feedback terms. The dynamic pressure signal ($q$) is obtained from an air data computer 23 which receives pressure information from pitot and static pressure probes on the airplane. These pressures are converted in the air data computer to electrical signals proportional to static pressure ($p$), vertical speed ($\dot{h}$), Mach number (M), and calibrated airspeed ($V_c$). Dynamic pressure is derived from the relationship:

$$q = 0.7 M^2 p \quad (24)$$

The dynamic pressure can be expressed in terms of the equivalent velocity of an incompressible fluid ($V_e$) having the density of air at sea level and 59° F ($\rho_o$), when brought to rest:

$$q = \frac{1}{2} \rho_o V_e^2 = f^2 q_c \quad (25)$$

where $f$ is the compressibility factor and $q_c$ is the pressure differential between the pitot and static probes. The compressibility factor is a function of Mach number.

For altitudes below 10,000 feet, it is sufficiently accurate to substitute calibrated airspeed for equivalent airspeed since $$f_o^2 q = \frac{1}{2} \rho_o V_c^2 \quad (26)$$

$f_o$ is nearly the same as $f$ at low altitudes.

In FIG. 9 the output of sum amplifier 49 is a signal proportional to $C_L$ and this signal is divided, as by conventional divider network 56, by the output of L/W computer 82 to thereby provide an output proportional to $(C_L)/(L/W)$. After amplification by a gain proportional to the wing area constant S the signal is multiplied, in conventional multiplier 57, by the $q$ output of air data sensor 23. Thus, equation (20) is solved and the upper input to sum amplifier 58 is a signal proportional to computed aircraft weight $W_C$. The $W_C$ signal output of amplifier 58 is applied to a low pass filter and integrator network 59 to the output for which is fed back to sum amplifier 58 to be subtracted from its original input.

The coefficient of lift contribution to the $W_C$ equation (as implemented in FIG. 9) has several dynamic deficiencies. The $C_L$ aircraft characteristics for steady state conditions are accurately known and are reflected in equation (23). During dynamic conditions, however, the information is not known with sufficient precision. Another dynamic deficiency relates to equation (13) for angle of attack, which equation includes inertial terms and therefore is correct only when there are no winds relative to the earth. In the presence of wind and wind shear conditions, however, dynamic errors will arise.

The purpose of the weight error feedback signal shown in FIG. 9 is to eliminate these dynamic errors. It recognizes the fact that the actual weight of the aircraft varies slowly. Because of the dynamic errors, the signal represented by equation (20) will vary considerably during transients and wind shear conditions. The integrator configuration shown in FIG. 9 accordingly operates to filter the computed weight signal in accordance with the following relationship:

$$W = W_C \left\{ \frac{1}{\tau_w(1+k)s+1} \right\} \quad (27)$$

where $s$ is the differential operator with respect to time.

The difference between the instantaneous value (equation 20) and the filtered value (equation 27) is designated the weight error signal:

$$\epsilon_w = W_C \left\{ \frac{\tau_w s}{\tau_w(1+k)s+1} \right\} \quad (28)$$

As shown in FIG. 9, this error signal is fed back via lead 63 into the angle of attack computer 48 in a closed loop manner. The gain of the feedback signal ($k_w$) determines the degree of correction. The magnitude of the gain is limited in a practical case because the filtered weight signal will not respond accurately to even the relatively slow variation in aircraft weight due to fuel burn off if the feedback is too high. A practical limit is dictated by an equivalent closed loop filter time constant, $(1+k)T_w$, between 200 and 500 seconds.

Equation (20) represents a computation of the weight that is supported by aerodynamic forces on the aircraft. During the ground roll of the aircraft prior to lift off, the weight of the aircraft is partially supported by the landing gear and partially by aerodynamic force. The portion supported by the aerodynamic force increases during the ground roll until, at lift off, the entire weight is transferred from the landing gear to the aerodynamic surfaces. It is therefore desirable that the weight computation be updated rapidly to the point of lift off.

The output of sum amplifier 49 of FIG. 9 (equation 23) represents the computation of steady state coefficient of lift when the aircraft lift characteristics are not affected by proximity to the ground. The ground effect generally occurs when the aircraft is at heights which are less than a single wingspan length. When the aircraft is rolling on the ground, the direction of the relative wind behind the wing remains essentially parallel to the X-axis of the aircraft. As the aircraft moves away from the ground after lift off the direction of the relative wind behind the wing is modified to have a downward component (downwash) which changes the aerodynamic force on the tail. The lack of downwash when moving on the ground changes the lift characteristics of the aircraft to such an extent that equation 23 cannot be used for accurate weight computation during the ground roll.

The instantaneous parameters for determining the gross weight at lift off are lift over weight ratio (L/W), dynamic pressure ($q$), and coefficient of lift at liftoff ($C_{L_{LO}}$). The lift over weight ratio per equation 19 is primarily a function of normal acceleration ($A_Z$) and is, therefore, accurately known at lift off. The dynamic pressure is also accurately determined at lift off, being derived in air data computer 23 per equation 24. The value of $C_{L_{LO}}$ is a function of the flap/slat configuration, the horizontal stabilizer position, and the pitch attitude of the aircraft relative to the ground at lift off.

FIG. 10 is a block diagram of a computer configuration used to determine the gross weight (W) of the aircraft at lift off. For the purposes of this disclosure lift off is defined as that moment during the rotation maneuver when the pitch attitude of the aircraft attains a predetermined value $\theta_{LO}$). The value of $\theta_{LO}$ is set to be slightly higher than the actual pitch attitude existing when the wheels of the aircraft leave the ground. In general, jet aircraft leave the ground within a relatively narrow band of pitch attitude values. In order to obtain an accurate measure of lift over weight ratio it is necessary that the aircraft be completely airborne so that no portion of the weight is supported by the landing gear. The lift off detector is a switch which is energized and latched when the pitch attitude of the aircraft first attains $\theta_{LO}$. The lift off coefficient generator derives a signal which represents the value of $C_{L_{LO}}$ for the specific settings of flap ($\delta_F$), horizontal stabilizer (i $i_H$) and lift off pitch attitude ($\theta_{LO}$).

The lift off weight is determined by a continuous computation during the ground roll using a very small value ($Tw_2$) of the normal gross weight filter time constant ($Tw_1$). At the moment of lift off the instantaneous value of computed weight is stored and used subsequently as the reference value for generating the weight error signal. This is done by switching to a long time constant ($Tw_1$) gross weight filter. Thus, in in FIG. 10, the coefficient of lift computer 49' (which may comprise those elements of FIG. 9 feeding amplifier 49) supplies its normal airborne value output to the upper contact of switch 201 and thence to divider 56 and multiplier 57 to sum amplifier 58 as in FIG. 9. However, during the ground roll, lift off detector and latch 26 is not operated whereby switch 201 is in its lower position as illustrated. In this position, a lift off coefficient of lift generator 203 supplies the value of coefficient of lift ($C_{L_{LO}}$) which is predetermined as a function of the take off position of the flaps, $\delta_F$, (and slats) and horizontal stabilizer $i_H$, and a predetermined value of pitch attitude $\theta_{LO}$, whereby the aircraft weight computation at lift off is based on this predetermined value of $C_{L_{LO}}$. Also, as illustrated, the lift off detector 26 actuates a switch 204 which, under airborne conditions, as described in FIG. 9, supplies the output of amplifier 58 and filter 59 to the input of the integrator 60.

In the preferred embodiment of the present invention, the switching threshold of lift off detector and latch 26, is a predetermined value ($\theta'_{LO}$) of the pitch attitude of the aircraft which is slightly higher or greater than the actual lift off pitch attitude $\theta_{LO}$. The difference between $\theta_{LO}$ and $\theta'_{LO}$ is such as to assure that the aircraft is airborne and that therefore the value of L/W is based on airborne data.

As stated above, the lift off weight is being continuously computed during the ground roll using a very small value of the airborne weight filter time constant. This is accomplished by connecting a second filter 59' from the output of amplifier 58 to the lower contact of switch 204 whereby the lift off detector de-energized or unactuated, the weight computation is updated very rapidly.

At $V_R$, the pilot, following the dictates of the flight director 10, rotates the aircraft in pitch and when the pitch attitude first reaches $\theta'_{LO}$, the lift off detector 26 is actuated and latched. Switches 201 and 204 are moved to their upper positions. The value of the weight signal just prior to actuation of detector 26 was based on the predetermined value of $C_{L_{LO}}$ (including the predetermined lift off pitch attitude), L/W and $q$, which value was effectively clamped by integrator 60 by having its input switched from short time constant filter 59' to very long time constant filter 59. Thus, any weight error existing after actuation of detector 26 is immediately reflected at the output of amplifier 58 and fed back to the input of the normal airborne $C_L$ computer to correct any computation errors.

Using the weight error feedback concept of the present invention, it is now opportune to consider a simplified and practical solution to the angle of attack computation problems alluded to previously. The closed loop feedback correction allows approximations to be made to the exact implementations for angle of attack (FIG. 8) as well as corrections to the exact computations of flight path acceleration (equation 7) and flight path angle (equation 14). Of course, the approximations involve primarily only dynamic errors.

Figure 11:
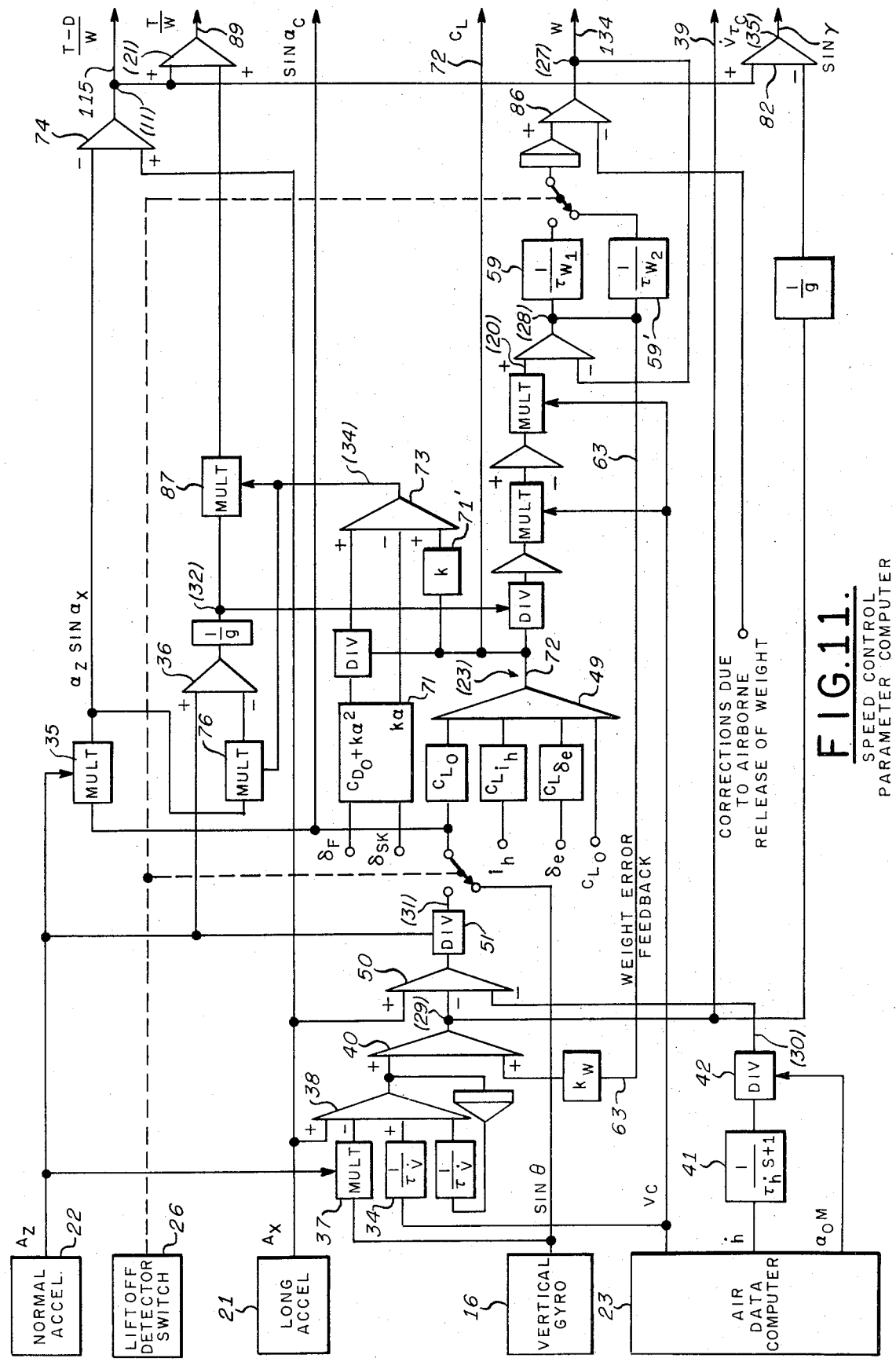
FIG. 11 is a detailed block diagram of the speed control parameter computer embodiment in the present invention.

Thus, in FIG. 11 a preferred embodiment for computer apparatus for providing the speed control parameters for a transport type of airplane is illustrated. Here again, the numbers in parentheses in the diagram represent signals proportional to quantities in accordance with corresponding equations of the specification.

The approximation used for flight path acceleration is:

$$\dot{V}_{TC} = \left(A_X - A_Z \sin \theta + \frac{V_C}{\tau_{\dot{V}}}\right)\left(\frac{\tau_{\dot{V}} s}{\tau_{\dot{V}} s + 1}\right) + k_w \epsilon_w \quad (29)$$

and is implemented as follows referring to FIG. 11.

Signals proportional to $A_X$ and $A_Z$ are supplied by longitudinal accelerometers 21 and 22, respectively, the latter term being multiplied by a signal proportional to sin $\theta$ supplied by vertical gyro 16 in multiplier 37, and both signals are supplied in the senses shown as inputs to sum amplifier 38. A calibrated airspeed signal ($V_c$) is supplied by air data computer 23 and is filtered through a washout circuit 34 before being applied to amplifier 38. A feedback with integral circuit around amplifier 38 is also provided for compensation purposes as will be described. The output of amplifier 38 is therefore a signal representative of the bracketed terms of equation (29) and it is supplied as one input to a further amplifier 40 whose other input constitutes the weight error feedback signal on lead 63 through a gain adjusting circuit $k_w$.

Equation (29) as implemented in FIG. 11, represents several very desirable practical considerations. The exact relationship for flight path acceleration (equation 7) consists of an algebraic sum of relatively large values. Each of the terms has a significant value during steady state conditions. By definition, the value of the flight path acceleration is zero under steady state conditions. It is therefore highly desirable to process the signal through a washout circuit to block transmission of steady state signals through the flight path acceleration computer. The desired value of the washout circuit time constant ($T_{\dot{V}}$) is about 20 seconds. While the use of a blocking network introduces dynamic errors, they are compensated by the weight error feedback term. In order to reduce the magnitude of the $k_w$ gain, use is made of a calibrated airspeed feedback term $(V_c)/(T_{\dot{V}})$ which partially corrects the dynamic error of the washout circuit. The rationale for using $A_X - A_Z \sin \theta$ in lieu of $(A_X - g \sin \theta) \cos \alpha - (A_Z - g \cos \theta \cos \Phi) \sin \alpha$ of equation (7) resides in the fact that the approximation is valid if angle of attack is relatively small and the value of $g$ is assumed to equal $A_Z$. The approximation is appropriate because the weight error feedback term has the ability to correct for errors in dynamic approximation as well as for perturbations due to wind shear conditions.

The requirements of the apparatus of FIG. 8 include a flight path angle computer 43 whose output is necessary as an input to the angle of attack computer. In FIG. 11 the derivation of flight path angle utilizes two readily available signals. These are the vertical speed signal ($\dot{h}$) from air data computer 23 and the Mach number signal ($A_1M$) also available from air data computer 23. The air data computer 23 is also the source of the calibrated airspeed signal ($V_c$) used in the flight path acceleration computation just described and also for generating the computed weight signal as described with respect to FIG. 9. The calibrated airspeed signal is approximately equal to equivalent airspeed for low values of airspeed and altitude typical of transport takeoff and landing conditions. As discussed previously, the air data computer can generate an accurate dynamic pressure signal ($q$) if required for high Mach applications.

Referring again to FIG. 11, the flight path angle computation is based on equation (30). A vertical speed signal $\dot{h}$ is supplied by air data computer 23 and is applied to a low pass filter 41 the output of which is divided by a Mach airspeed signal, also supplied by an air data computer 23, through divider network 42. The resulting output is a signal corresponding to flight path angle (sin $\alpha$) in accordance with equation (30).

The vertical speed signal from the air data computer is disturbed by anomalies of the airplane's static source which is affected by pitch rate of the airplane. It is therefore desirable to filter the vertical speed signal with a time constant of one to three seconds. This again introduces dynamic errors which, however, are corrected by the weight error feedback technique. The approximation used is:

$$\sin \gamma_c = \frac{h\left(\frac{1}{\tau_h s + 1}\right)}{A_o M} \quad (30)$$

where $A_o$ is the speed of sound in air and $T_h$ is the filter time constant.

Referring still to FIG. 11, the signal proportional to $\sin \alpha$ is:

$$\sin \alpha_o = \frac{A_X - \dot{V}_{TC} - g \sin \gamma_c}{A_Z} \quad (31)$$

Equation (31) is equivalent to the exact equation (13) except that $\cos \alpha$ is assumed to be equal to unity and computed values of flight path acceleration and flight angle, as compensated by the weight error feedback term, are used in accordance with equations (29) and (30), respectively. Thus, in FIG. 11, these terms are combined in the senses indicated in summing amplifier 50, the output of which is divided by the $A_Z$ signal from normal accelerometer 22 in divider network 51, the output of which is the computed and corrected signal proportional to the angle of attack ($\sin \alpha$) of the aircraft. The L/W signal derived by the apparatus of FIG. 11 reflects a simplification from equation (19). As used in FIG. 11, the relationship is:

$$\left(\frac{L}{W}\right)_c = \frac{A_Z}{g}\left[1 - \frac{C_D}{C_L}\sin \alpha_c\right] \quad (32)$$

The signal proportional to $A_Z$ is again supplied by normal accelerometer 22. It is supplied to multiplier 35 the output of which is therefore $A_Z \sin \alpha_c$. This signal is multiplied by a signal proportional to ratio of the coefficient of drag $C_D$ to the coefficient of lift $C_L$, to be described below, and the product, $(C_D)/(C_L) A_Z \sin \alpha$, is supplied to sum amplifier 36 the output of which is a signal proportional to the numerator of equation (32). This output is modified by a gain factor $1/g$ to provide the desired computed lift over weight $(L/W)_c$ term. In FIG. 11, the coefficient of lift term $C_L$ is derived as in FIG. 8 and its signal appears at the output of sum amplifier 49.

Equation (32) is within ½ percent of the exact expression (equation 19). The ratio of $(C_D)/(C_L)$ is based on the following expression for coefficient of drag:

$$C_D = C_{D0} + k(C_L - A)^2 \quad (33)$$

where $C_{D0}$, $k$, and $a$ are constants. $C_{D0}$ and $k$ are functions of flap position; $a$ is a function of leading edge slat extension.

The ratio $(C_D)/(C_L)$ is therefore $$\frac{C_D}{C_L} = \frac{C_{D0} + ka^2}{C_L} - ka + kC_L \quad (34)$$

Thus, in FIG. 11 signals proportional to the predetermined functions of flap position and slat position $C_{D0}$, $k$ and $a$ are provided by function generator 71 having inputs from flap transducer 27 and slat switches 28. The output $(C_{D0} + ka^2)$ of function generator 71 is divided by $C_L$ to provide the first term of equation (34) and supplied as one input to sum amplifier 73, another input being the $ka$ signal from generator 71. The third input is the $C_L$ signal on lead 72 from amplifier 49 modified by function generator 71' as a function of flap position. The resultant output of amplifier 73 is therefore a signal proportional to the coefficients of drag and list ratio $(C_D)/(C_L)$ of equation (34). This signal is supplied to the L/W computer circuits, i.e., to multiplier 76 and amplifier 36 as described above for the solution of equation (32).

As will be discussed in detail below, and in accordance with the present invention, the reference coefficient of lift ($C_{L_{REF}}$) is a function of the thrust to weight ratio (T/W) of the aircraft and the excess of thrust to drag over weight ratio ((T−D)/(W)) is used to set the maneuver rate limits and to actuate the fast/slow indicator of the flight director in the takeoff and go around mode. Signals proportional to these quantities are also provided by the speed control parameters computer 32 illustrated in FIG. 11. The value of the excess of thrust to drag over weight ratio term is determined by equation (11) above. While equation (11) is an exact solution, it will be appreciated that the small angle assumption for $\cos \alpha$ is valid, thereby simplifying the computation circuitry. Thus, in FIG. 11, the output of multiplier 35 is summed with the longitudinal accelerometer signal $A_X$ from accelerometer 21 in amplifier 74 the output of which is therefore a signal proportional to equation (11), $\cos \alpha$ being assumed unity.

Equation (21) is also simplified by the same small angle assumption. The output of amplifier 36 and gain factor $1/g$, which represents equation (32) is multiplied by the $C_L$ signal from amplifier 34 in multiplier 87, its output being summed with the output 115 of amplifier 74 (equation 11) to thereby provide the solution for equation (21), a signal on lead 89 proportional to the thrust-to-weight ratio (T/W).

The computed flight path angle output, designated $\sin \gamma$, is based on a rearrangement of equation (10), assuming cosine $\alpha$ is unity:

$$\sin \gamma = (T-D)/(W) - (\dot{V}_{TC})/(g) \quad (35)$$

Equation (35) represents a more accurate measure of flight path angle than does equation (30) because it includes the dynamic compensation of the weight error feedback term.

In FIG. 11, the (T − D)/(W) term on lead 15 is applied to sum amplifier 82, the other input of which is the output ($\dot{V}_{TC}$) of amplifier 40 after modification by a gain factor proportional to $1/g$. Thus, the output of amplifier 82 is a signal accurately proportional to the flight path angle ($\sin \alpha$) of the aircraft and may be useful in other aircraft systems.

The lift off detector 26 discussed above with respect to FIGS. 11 and 12 is triggered upon the aircraft achieving a predetermined pitch attitude. This embodiment has the advantage that switching is accomplished by data readily available in the system and requiring no sensor switches external to the system. However, it will be understood that, while this is a preferred embodiment the detector 26 could be triggered by other means sensing lift off; for example, by a switch on the landing gear operated when the weight of the aircraft is removed therefrom. Thus, in the over-all apparatus shown in FIG. 2, the lift off detector 26 is intended to be a generic illustration.

Military aircraft will release weights of known or predetermined magnitude such as bombs, stores, etc., intermittently during flight and therefore such sudden changes in craft weight would require that the gross weight computation be updated at the time of release. Because of the deliberate action required, the update can be accomplished by predetermined values that are synchronized with the actual release of the specific items and inserted into amplifier 86 of FIG. 11 whose output on lead 134 is a signal representative of aircraft gross weight W in accordance with equation (27).

THRUST RATING COMPUTER

Returning now to FIG. 2, the function of the thrust rating computer 33 is to generate a value of an engine parameter which is indicative of optimum thrust performance under the existing conditions of outside air temperature, altitude, Mach number, engine bleed conditions, and aircraft operating mode. For some engines the proper parameter is the speed of the low speed rotor which is attached to the fan (usually designated fan speed, $N_1$). For other engines the proper parameter is engine pressure ratio (usually designated EPR).

The thrust rating computer 33 utilizes sensor inputs comprising signals in accordance with outside air temperature from sensor 29 and altitude and Mach number from air data computer 23, engine fan speeds from engine tachometer 30. The signals are processed to derive an error signal on lead 165 proportional to the difference between the desired engine fan speed (or engine pressure ratio) and the actual value of the fan speed of the fastest engine. This error signal is utilized by the autothrottle computer illustrated in FIG. 15 to adjust engine throttles 38 to maintain optimum thrust conditions when desired by the pilot, as will be described. The particular operating mode is determined by using suitable pushbuttons on a cockpit controller (not shown). Typical selectable operating modes of the speed control system of the present invention are take-off, continuous climb, cruise, approach and go-around.

The thrust rating computer 33 also generates an "engine out" discrete signal on lead 90 which is indicative of an engine failure. This is predetermined by sensing that the fan speed (or EPR) of any of the engines has dropped below some predetermined value. The "engine out" discrete is used to adjust the reference value of coefficient of lift ( $C_{L_{REF}}$ ) during takeoff to correspond with $V_2$ target speed under a failed engine condition and $V_2 + 10$ knots when all engines are operating normally as described below.

AUTOPILOT/FLIGHT DIRECTOR SPEED COMMAND COMPUTER

The primary function of the autopilot/flight director speed command computer 34 of FIG. 2 is to generate a regulating signal (E) for moving the pitch command pointer 11 of the attitude director indicator 10 for takeoff and go-around guidance. The control equation that governs the regulating signal is:

$$E = k_1(C_{L_{REF}} - C_L) + k_2 \dot{V}_{TC} - k_3(Ts/Ts+1)\underline{\sin}\theta \quad (36)$$

In accordance with the teachings of the present invention, the reference coefficient of lift ( $C_{L_{REF}}$ ) is the target value of coefficient of lift that the aircraft should attain when it is stabilized on its initial climb path at the time it clears the end of the runway during takeoff and go-around modes of operation. It corresponds to the target takeoff speed that is tabulated in the aircraft operating handbook and is consistent with the Federal Airworthiness Standards for safety speeds for a particular airframe. The value of $C_{L_{REF}}$ is a variable that will change instantly if an engine should fail or for any other factors that affect the thrust of the engines, such as fan speed, engine pressure ratio, airspeed, air temperature, altitude, Mach number, engine bleeds, etc. It also adjusts itself automatically with configuration changes of flaps, slats, and direct lift spoilers.

Figure 12:
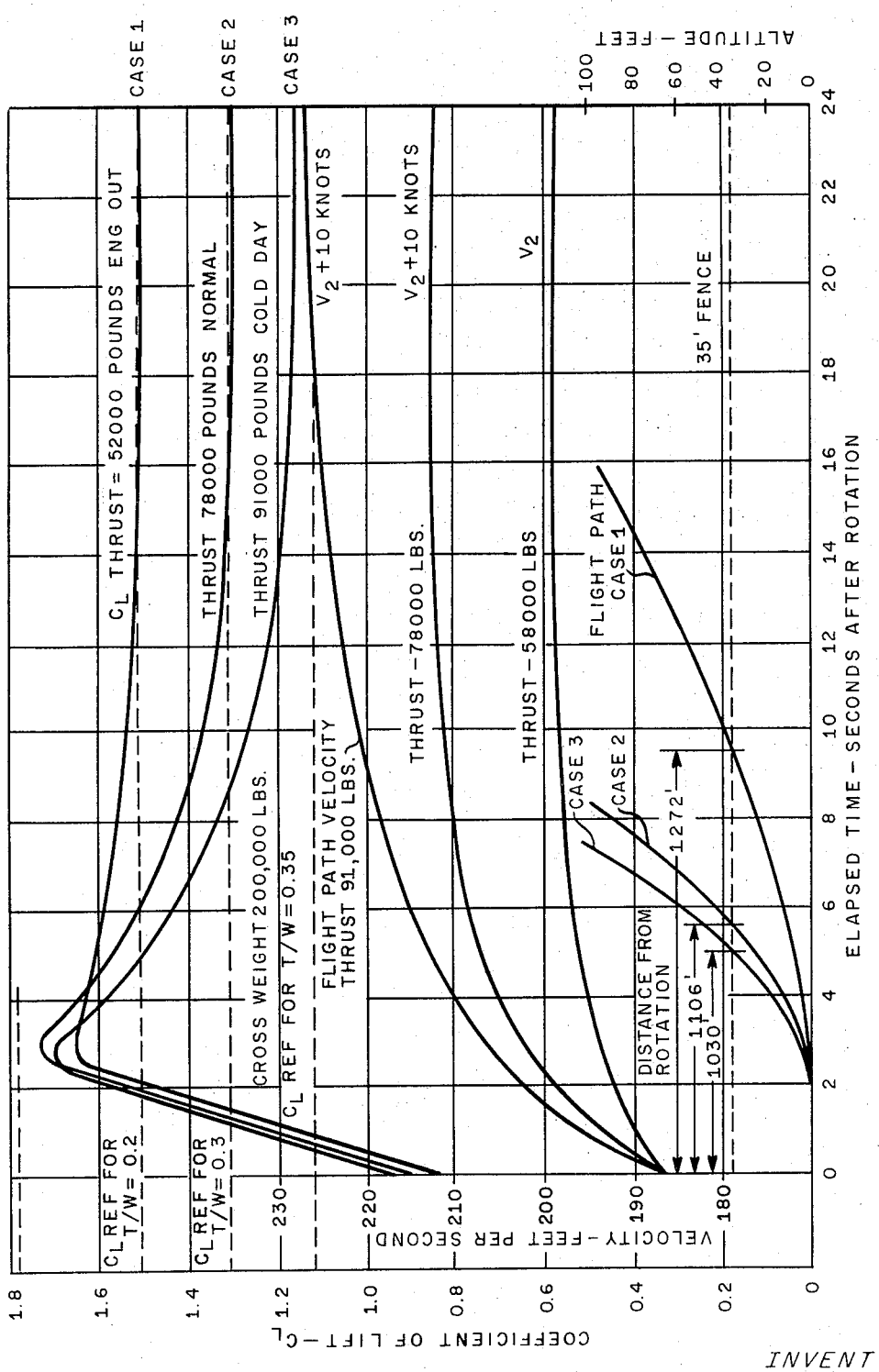
FIG. 12 is a graph showing a series of curves showing how parameters of the system vary under different operating conditions.

FIG. 12 shows calculated takeoff time histories for a typical three engine commercial transport aircraft under three typical constant thrust-to-weight ratio conditions. The curves show the time variation of actual coefficient of lift, flight path velocity, and flight path trajectory from the time of rotation when under the regulating signal control of equation 36. Note that by adjusting $C_{L_{REF}}$ as a function of T/W, the peak value of momentary coefficient of lift does not exceed a value corresponding to a 10 percent margin above stall for all values of engine thrust.

Figure 13:
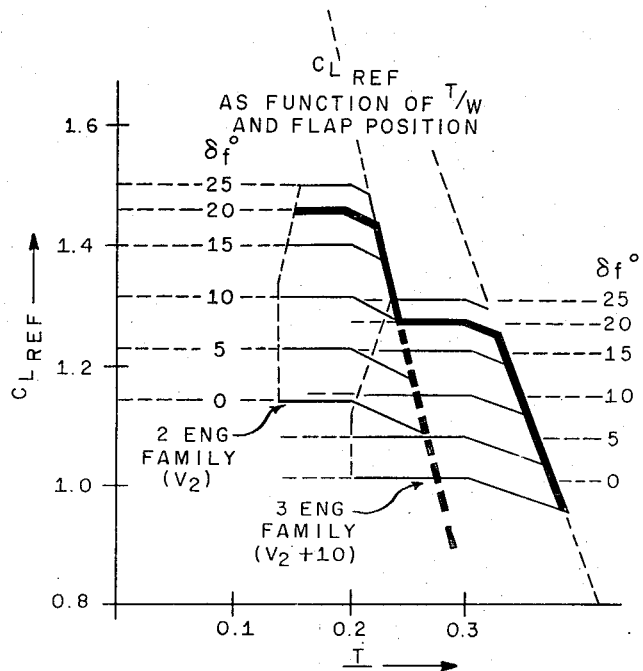
FIG. 13 showing how the reference coefficient of lift is programmed as a function of thrust over weight ratio and flap setting for a typical jet aircraft.

Typical programs for reference coefficient of lift versus thrust-to-weight ratio are illustrated in FIG. 13 for a three engine jet transport at various flap settings. These programs are used to establish the handbook safety speeds for the corresponding values of engine thrust, flap setting, and aircraft gross weight based on the formula:

$$V_{HDBK} = \sqrt{\frac{W}{C_{L_{REF}}\left(\frac{1}{2}\rho_o S\right)}} \quad (37)$$

The characteristics shown in FIG. 13 represent separate program families for two-engine operation and three-engine operation, respectively. The two-engine family reflects $V_2$ speed; the three-engine family reflects $V_2 + 10$ knots speed. The three-engine family is generated from the two-engine ($V_2$) family by shifting each point of the two-engine characteristics to a corresponding point along the T/W axis to a value 50 percent greater and along the $C_{L_{REF}}$ axis to a value 14 percent less. For example, the two-engine $C_{L_{REF}}$ point corresponding to a T/W equal to 0.2 for flap 25° is 1.510. The corresponding point for three-engine operation is $C_{L_{REF}}$ equals 1.300 at T/W equal to 0.3.

The flat portion of the two-engine $C_{L_{REF}}$ characteristic at thrust to weight ratios less than 0.2 reflects $V_2$ speed equal to 1.2 $V_{STALL}$. The $C_{L_{REF}}$ is decreased (corresponding to increased airspeed) for thrust-to-weight ratios greater than 0.2. The decreasing characteristics reflect the effects of minimum control speed and the necessity of keeping the momentary value of coefficient of lift from exceeding the value which approaches the stall speed of the airplane at the time the aircraft is rotated for lift off.

Referring now to FIG. 14 which schematically illustrates the autopilot/flight director speed command computer, the control equation (36) utilizes the $C_L$ and $\dot{V}_{TC}$ signal outputs 72 and 39 of the speed control parameter computer 32 directly. The regulating signal E is shown in FIGS. 2 and 14. It is displayed as a command on the ADI 10. The horizontal needle 11 displays by vertical displacement from a reference index 12, a pitch attitude command, which command is satisfied by the pilot changing craft pitch attitude by an amount necessary to zero the pointer 11 on the index 12. The pointer 11 is driven by a suitable meter movement 13, which may be of the type disclosed in the above-mentioned Clift application, controlled by a command voltage output from flight director computer illustrated generally at 14. The regulating signal E contains a short period damping signal, supplied to flight director computer 14 by a pitch rate computer 111 which receives on lead 120 a $\sin \theta$ signal from vertical gyro 16. The regulating signal (E) also contains the difference between a signal proportional to a reference coefficient of lift supplied by $C_{L_{REF}}$ computer 18 and an actual coefficient of lift signal on lead 72 supplied by the speed control parameter computer 32. It further contains a system damping signal on lead 39 proportional to the acceleration along the flight path ($\dot{V}_{TC}$) from computer 32.

Still referring to FIG. 14, the $C_{L_{REF}}$ computer 18 receives three inputs: a signal 66 proportional to flap position ($\delta_F$) from flap position transducer 27, a signal 89 proportional to thrust-over weight ratio from the speed control parameter computer 32, and an engine out discrete 90 produced by the thrust rating computer 33. The latter signal is supplied to computer 18 for the purpose of shifting the $C_{L_{REF}}$ program should an engine fail after $V_1$ is reached as described. $V_1$ is the speed at which the aircraft is committed to take off.

The flap signal 66 is applied to a non-linear electronic function generator 92 which reproduces the flat portion of the characteristics shown typically in FIG. 13 as a function of flap position. As shown in FIG. 13, the value of $C_{L_{REF}}$ in the flat region will, in generally increase as the flap angle is increased. The thrust-to-weight ratio signal supplied to computer 18 on lead 89 is limited and combined with the $C_{L_{REF}}$ function generator output in such a manner as to produce the desired slopes of the $C_{L_{REF}}$ program as a function of T/W. The changes in the slope of the curves, occurring at predetermined values of T/W, are provided by deadzone amplifier 95, sum network 94, sum network 96 with its predetermined bias, limiter network 97, and sum network 98. The shifting of the family of characteristics under an engine out condition is accomplished by gain change networks 931, 932, 933 and 934 which are controlled by a signal 90 from the thrust rating computer 33. Thus, assuming that all engines are operating properly, function generator 92 will supply an output corresponding to a value of $C_{L_{REF}}$ for the existing flap condition, in accordance with the typical characteristics shown in FIG. 13 for three-engine operation.

Assuming a value of T/W below 0.3 this signal is supplied unmodified through gain circuit 931 to sum circuits 94 and 98 and thence to the flight director command computer 14. Under these conditions, the gains of 932 and 933 serve to extend the deadzone of amplifier 95 to a value corresponding to a T/W of 0.3 while the gain of circuit 934 and the predetermined value of the bias through sum network 96 serve to maintain the input of limiter 97 low and therefore its output zero. When the value of T/W reaches 0.3, the deadzone amplifier 95 begins to pass further increases of the T/W signal and this signal reduces the output of function generator 92 through the sum circuit 94 at a predetermined slope as required by the three-engine family of FIG. 13, corresponding to $V_2$ + 10 knots.

As the value of T/W increases further, the output of sum circuit 96 exceeds the output of sum circuit 94 at the input to limiter 97 whereby its output which is differentially summed with the output from summer 94 begins to drive the output from summer 98 downward thereby reducing the $C_{L_{REF}}$ signal to the flight director computer 14 by way of lead 99.

If an engine fails after $V_1$ is reached, the engine-out discrete 90 will change the gains of circuits 931 through 934 to shift the break points of the curves as illustrated in FIG. 13 to accommodate the lower T/W. In effect, the values are increased to thereby establish two-engine $V_2$ speed rather than the three-engine $V_2$ + 10 speed. For example, the gain of 931 is increased at the same time that the deadzone of amplifier 95 is decreased to correspond to a T/W value of 0.2 by changing the gains of 932 and 933. In addition, the gain of 934 is changed to shift the $C_{L_{REF}}$ limit curve to the left to accommodate the reduced T/W.

The regulating signal ( t ) to the flight director pitch command bar 11 directs the pilot to rotate the aircraft in pitch until the bar is centered on the reference airplane symbol 12 and thereafter maintain it centered by manual pitch attitude control. By thus maintaining the bar centered the control equation (36) will be satisfied and the craft will maintain the flight path defined thereby.

In FIG. 14, the flight director command computer 14 is illustrated in detail. The output signal of $C_{L_{REF}}$ computer 18 is routed to the input of flight director computer 14 on lead 99 where it is applied to one terminal of a switch 105, the blade terminal of which is connected to variable rate limiter circuit 106, which varies in accordance with the magnitude of potential flight path angle of the aircraft which is equal to (T-D)/W and appears on line 115 (FIG. 2). This switching function may of course be accomplished by conventional logic circuits and transistor switches. The pushover reference described above, is essentially a constant airspeed command of 250 knots which will be achieved when aircraft acceleration has decayed to zero. The output limiter 106 is applied to an integrator 107 the output of which is supplied to sum network 108 and simultaneously fed back to the input of limiter 106. The limits on the magnitude of the signal by limiter 106 together with the time constant of the integrator 107 serve to establish a rate of change of airspeed consistent with an aircraft acceleration which will not result in a descending condition. This is achieved through the variable limit as a function of potential flight path angle, as illustrated by (T − D)/(W).

The $C_L$ of equation 36 is supplied to flight director computer 14 via lead 72 from the speed control parameter computer 32 and is applied to another input of sum circuit 108. For the purpose of anticipating the approach of the airspeed of the aircraft to that defined by $C_{L_{REF}}$ term ($V_2 + 10$ or $V_2$), the signal 39 proportional to the aircraft acceleration along its flight path ($\dot{V}_{TC}$) derived in the speed control computer 32, is router to flight director computer sum circuit 108 via lead 39. The output of sum circuit 108 is therefore a signal proportional to the difference between the commanded $C_{L_{REF}}$ and the actual $C_L$ plus the anticipation term $\dot{V}_{TC}$ and this resultant signal could normally be sufficient as the flight director command. However, two further controls are included; a pitch angle limiter for limiting the maximum pitch angle that can be commanded and a pitch attitude rate term that improves the short term pitch stability of the aircraft when under manual control. Since both of these controls are a function of pitch attitude, a signal 120 proportional thereto (sin $\theta$) is supplied to the flight director computer 14 from the vertical gyro 16. The pitch attitude signal is supplied positively to one input of limiter 109 and negatively to the output thereof. The other input to limiter 109 is the command output from sum circuit 108. Thus, for values of the command below the limit established by limiter 109, which corresponds to say 20° pitch attitude, the pitch signal passes through the limiter with the command but is immediately cancelled by the pitch signal at the output of the limiter, as in sum circuit 110, and thus the command is not pitch limited. However, when the command exceeds the pitch limit, the excess signal is not cancelled by the negative pitch signal supplied to sum circuit 110 and therefore, the excess command signal operates to limit the signal to flight director pointer 11, to a value which does not exceed the predetermined positive pitch limit. The pitch signal on lead 120 is also supplied to a rate network 111 for deriving the pitch rate term for providing short period attitude stability. A lead/lag filter 112 is provided for improving the dynamics of the flight director pointer at low pitch displacement commands.

When the pushover mode is actuated by switch 105, the signal to summer 108 is switched from lead 72 ($C_L$) to lead 121 ($V_c$), calibrated airspeed. The pushover mode includes the flap-retraction maneuver and acceleration to 250 knots for climb out in accordance with federal regulations governing maximum speeds below 10,000 feet of altitude.

Thus, at pushover, switch 105 is actuated so as to remove the $C_{L_{REF}}$ command and substitute therefor a reference airspeed of 250 knots. The pushover maneuver altitude is defined by air safety requirements and is normally initiated at an altitude of between 1,200 feet and 2,000 feet. The pushover altitude is determined by integrating the vertical speed signal 116 developed in the air data computer 23. This signal is applied to an integrator 117 which integrates the vertical speed signal and when its output reaches a predetermined value corresponding to about 1,500 feet of altitude, switch 105 is actuated, as schematically illustrated in the computer 14 of FIG. 14.

During the take-off/go-around mode of operation (TO/GA) it is desirable to display the potential flight path angle of the aircraft. This is the flight path angle that the aircraft will attain when the aircraft is stabilized (flight path acceleration is zero). An examination of equation (10) indicates that the potential flight path angle is equal to $(T - D)/(W)$. This signal on lead 115 is available from the speed control parameter computer 32, FIG. 11. Accordingly, during TO/GA operation, the meter 113 can be used to display potential flight path angle.

FAST/SLOW DIRECTOR AND AUTOTHROTTLE COMPUTER

The climb-to-cruise, cruise, letdown, approach and landing modes required that the aircraft throttle levers be controlled to maintain an optimum thrust condition of the engines or a desired airspeed, which speed should never be less than a computed safe margin above stall. The system of the present invention provides these functions by means of a fast/slow display on the ADI and/or by means of automatic throttle control shown schematically in FIG. 15. In either case, the apparatus of the present invention computes the minimum speeds as a function of flap and slat positions and gross weight of the aircraft. It also computes the maximum speeds based on structural protection of the extended flaps. This data is used to override any pilot selected airspeed which is outside the range of values between the safe maximum value and the safe minimum value. The pilot may be warned through suitable annunciators that he has selected an airspeed outside the safe range of speeds.

The automatic throttle control mode also utilizes a comparison of engine fan speed (or EPR) with an optimum value to control throttle position during climb-to-cruise and go-around. The error signal is supplied from the thrust rating computer 33 (FIG. 2) which determines the optimum thrust condition of the engine and expresses it as optimum fan speed $N_1$ (or EPR). The throttle control system uses this data not only as a direct throttle control reference independent of airspeed but also as a throttle position limiter when the system is under airspeed reference control.

The computation of the minimum airspeed value is based on the following relationships:

$$V_{min} = k_{sm} V_s \quad (38)$$

$$V_{min} = \sqrt{\frac{W}{\left(\frac{C_{L_{max}}}{k_{sm}}\right)\left(\frac{1}{2}\rho_o S\right)}} \quad (39)$$

where $V_s$ is stall speed based on most critical center of gravity position, $k_{sm}$ is the stall margin required, $C_{L_{max}}$ is the maximum value of coefficient of lift corresponding to the stall speed as defined by Federal Airworthiness Standards. In general, $C_{L_{max}}$ is a function of flap/slat configuration and the required stall margin (ksm) is normally reduced for increasing deflections of the flaps. A typical stall margin program would start at 1.50 for zero flap deflection and decrease to 1.35 at the full flap deflection used for landing.

The implementation used in the computation of $V_{min}$ shown in FIG. 15 is based on a rearrangement of equation (39) as follows:

$$W - k_{min}V^2_{min} = 0 \qquad (40)$$

$$k_{min} = \left(\frac{C_{L_{max}}}{k_{sm}^2}\right)\left(\frac{1}{2}\rho_o S\right) \qquad (41)$$

Equation (41) is therefore a function of flap position only.

Accordingly, the input signal at lead 66 from flap transducer 27 of FIG. 2 to flap function generator 136 is converted to a signal proportional to $k_{min}$ at the output of circuit 136. This signal is multiplied twice in succession by multiply circuits 137 and 138, the multiplier being proportional to the output signal of adder-integrator 139. The inputs to the circuits 139 consist of the algebraic sum of the signals proportional to W and $V^2_{min} k_{min}$. The output of integrator circuit 139 will change until the algebraic sum of W and $V^2_{min}k_{min}$ is exactly zero, which situation satisfies the requirements of equation (40). The equilibrium condition at the output of circuit 139 will therefore be proportional to the minimum safe speed ($V_{min}$).

The pilot may select a desired speed on the $V_{SET}$ controller 31 which generates a voltage proportional to a counter readout on the panel of the controller (not shown). This voltage is limited in circuit 148, the limit of which is variable and determined by the output of function generator 147 as a function of the flap position signal 66. The output of limit circuit 148 represents the pilot setting with the proper maximum limit based on structural limitations of the extended flaps.

The output signal from 148 supplied as one input to an additional limiter 149 the other input of which is the $V_{min}$ signal on lead 140. The latter signal is also supplied to sum and limiter network 150 together with the output of limiter 149. The effect of limiter 149 (having the characteristic shown) and sum network 140 is to insure that the speed signal set by the pilot is never less than the minimum safe speed signal. An annunciator which receives the set speed signal and the minimum speed signal serves to warn the pilot that he has set in a speed less than the safe speed. A further annunciator (not shown), responsive to the output of limiter 148 may also be provided to warn the pilot that he has selected a speed too high for the existing flap setting.

The limiter circuit 150 in conjunction with integrator 151 operates on the algebraic sum of the output of 151, the output of 140, and the output of 149 to provide a rate of change of command speed ($\dot{V}_{CMD}$), keeping in mind that the output of 151 is the integral of $\dot{V}_{CMD}$ or command airspeed $V_{CMD}$. The asymmetric nature of the limiter circuit 150 provides airspeed rate commands which are set higher for the increase direction compared to the decrease direction. The purpose of this characteristic is to allow more rapid throttle advance for acceleration as compared to deceleration and thus minimize undershoot of airspeed toward stall.

The airspeed rate command output of limiter 150 is applied to integrator 151 to generate the steady-state speed reference, which signal is supplied to sum circuit 152 for comparison with the actual airspeed ($V_c$) signal 121 from air data computer 23. The $V_{CMD}$ signal is also fed back to limiter 150 to close the loop around the limiter, thus providing the desired asymmetric characteristic.

The output of sum circuit 152 on lead 153 is applied to the fast-slow indicator 113 of flight director 10 suitably smoothed or lagged through networks 154 where the lag is complemented by adding an airspeed rate term $V_{TC}$ via lead 39 from the speed control parameter computer (FIGS. 2 and 11). Thus the pilot is advised as to the performance of the autothrottle system by this display of combined airspeed error and airspeed rate of change. When the autothrottle system is disengaged the pilot may use this director indication for manual control of the throttles.

The regulating signal for director control of throttle is a throttle rate command ($\dot{\delta}_{TH}$) defined by the following control equation:

$$\dot{\delta}_{TH} = k_4(V_{CMD} - V_c) - k_5 \dot{V}_{TC} \qquad (42)$$

The output of sum circuit 152, which represents the airspeed error is applied to the input of autothrottle servo limiter 155 through two paths, a "displacement" path and an "integral" path. The "integral" path includes washout or lead network 156 and a lag-limit or integrator-limit network 157, the latter circuit also receiving the command rate output of limiter 150. The "displacement" path includes a gust filter 158.

The function of the washout network 156 in the integral path is for the purpose of reducing any overshoot of airspeed in response to a reference or selected airspeed change due to the operation of the integral path. The washout of the airspeed error also serves as a substitute for integral of rate of change of throttle position as a pseudo-throttle position feedback term to improve dynamic response of the throttle servo.

The gust filter 158 is basically a high pass or washout filter and comprises an integrator 159 connected in feedback around a high gain amplifier 160, the latter receiving the airspeed error signal on lead 153. Flight path acceleration signal 39 ($\dot{V}_{TC}$) is also used as a low frequency damping term. The gust filter 158 serves to improve the performance of the system under wind gusts and wind shears having components along the flight path.

Signals proportional to elevator deflection $\delta_e$ and horizontal stabilizer deflection $\delta_{i_H}$, provide throttle movement in anticipation of the speed effects resulting from these surface deflections. This effect is further enhanced by applying the surface deflection term through a high pass or washout network 167.

A further control of throttles provides for automatic positioning of throttles to obtain optimum engine conditions as determined by the thrust rating computer 33, FIG. 2. The signal output 165 of the thrust rating computer represents the difference between actual speed of the highest engine fan and the optimum value, based on operating mode. This fan speed error signal is used as an independent control of the engine throttles to maintain the optimum fan speed of the engines. It is also used to momentarily limit the throttle movement under set airspeed control if the system tends to accelerate too rapidly and thus overboost the engines.

FIG. 15 illustrates schematically the necessary circuitry to accomplish these functions. For example, when the engines are to be controlled solely from fan speed error, signal 165 is combined with an anticipatory rate term from rate network 166 and the required interlock circuitry is actuated for switching from airspeed to fan speed control. Under airspeed control, moreover, when the airspeed error rate exceeds a predetermined magnitude (as by monitoring the difference between the outputs of amplifier 160 and limiter 157 and actuating the switch shown), the system also switches to fan speed control until the airspeed error rate is reduced to an acceptable value. A switch associated with the input of integrator 159 is opened when the fan speed error signal takes over and the existing airspeed error signal is stored. When the airspeed error rate drops to an acceptable value, airspeed control can be resumed smoothly.

The autothrottle control system shown in FIG. 15 includes means to retard the throttles in conjunction with the flare phase of an automatic landing and also a full retard when the wheels touch the runway. A preset rate of retard is initiated when the aircraft attains a preset flare altitude above the runway as detected by a radio altimeter. A further throttle retardation at a greater rate to the idle position is accomplished when the aircraft touches the runway as indicated, for example, by spin-up of the landing gear wheels.

The preferred servo configuration to perform this throttle control function may be the dual channel system of my U.S. Pat. No. 3,504,248, which configuration has fail-operational characteristics whereby no single failure can interfere with satisfactory performance.

In the foregoing, I have described a preferred embodiment of a speed command and autothrottle control system for aircraft which operates to supply pilot guidance through a flight director indicator or automatic control of engine throttles during the aircraft's entire flight profile from take-off to touch down, maintaining proper safety speed margins for all aircraft configurations and operating conditions. The computations of the control parameters involved take into consideration and are consistent with the airworthiness standards for safety of flight set down by regulatory agencies of the Federal Government and further reflect those parameters set forth in flight manuals published by the manufacturer of the certified aircraft so that the operation of the system is the same as that which the pilot would expect under conventional procedures.

However, while a preferred embodiment has been illustrated, it will, of course, be evident that many apparently widely different embodiments of my invention could be made without departing from the true scope and spirit thereof. It is therefore intended that all matters contained in the above description or shown in the accompanying drawings shall be interpreted as illustrative and not in a limiting sense.

What is claimed is:

1. Apparatus by means of which an aircraft may be controlled during take-off to approach and thereafter maintain an airspeed consistent with a safe stall margin, obstacle clearance, and climb gradient, comprising first computer means for providing a first signal corresponding to a reference coefficient of lift of said aircraft said reference coefficient of lift corresponding to said airspeed, second computer means for providing a second signal corresponding to the actual coefficient of lift of said aircraft, second computer means for providing a third signal corresponding to the acceleration of the aircraft along its flight path, and means connected to receive said first, second and third signals for supplying an output signal corresponding to the algebraic sum thereof.

2. The apparatus as set forth in claim 1 wherein said first computer means includes, further computer means for producing a signal proportional to the thrust-over-weight ratio of said aircraft, and means responsive to said thrust-over-weight ratio signal for modifying said reference coefficient of lift signal as a predetermined function thereof.

3. The apparatus as set forth in claim 2 for aircraft equipped with multiple engines wherein said first computer means includes a means responsive to the loss of one of said engines for further modifying the value of said first signal.

4. The apparatus as set forth in claim 2 wherein said further computer means comprises means for providing signals proportional respectively to components of acceleration of said aircraft along its longitudinal and normal axes, means for providing a signal proportional to the angle of attack of said aircraft, means responsive to the difference between said longitudinal axis acceleration signal and the product of said normal axis acceleration and angle of attack signals for providing a signal corresponding to thrust minus drag over weight ratio signal and said lift over weight ratio of said aircraft, means responsive to said normal acceleration and said angle of attack signal for providing a signal corresponding to the lift over weight ratio of said aircraft, and means responsive to said thrust minus drag over weight ratio signal and said lift over weight ratio signal for providing said thrust over weight ratio signal.

5. The apparatus as set forth in claim 1 for aircraft equipped with moveable surfaces for varying the lift characteristics of said aircraft wherein said first computer means includes a function generator means responsive to the positions of said moveable surfaces for modifying said first signal in accordance with a predetermined function of said moveable surface positions.

6. The apparatus as set forth in claim 1 for aircraft equipped with moveable control surfaces for varying the lift characteristics of said aircraft when said surfaces are deflected wherein said second computer means includes means for supplying a signal proportional to the angle of attack of said aircraft, and means responsive to the deflection of said control surfaces for modifying said angle of attack signal in accordance therewith.

7. The apparatus as set forth in claim 6 for aircraft wherein said control surfaces include moveable tail surfaces for adjusting forces on the aircraft in its longitudinal plane and wherein said last mentioned means includes means responsive to the deflection of said tail surfaces for further modifying said angle of attack signal whereby to compensate said actual coefficient of lift signal for shifts in the center of gravity of said aircraft.

8. The apparatus as set forth in claim 1 further including utilization apparatus for commanding a pitch attitude of said aircraft, and
  means for supplying said output signal to said utilization apparatus whereby to command a pitch attitude of said aircraft in accordance therewith.

9. The apparatus as set forth in claim 8 further including
  means for supplying a signal corresponding to the pitch attitude of said aircraft,
  means for supplying said pitch attitude signal to said utilization apparatus, and
  means for limiting the maximum value of said pitch attitude signal supplied to said utilization apparatus whereby to limit the maximum pitch attitude command of said craft when controlled in accordance with said utilization apparatus.

10. The apparatus as set forth in claim 9 further including,
  means responsive to said pitch attitude signal for deriving a signal proportional to the rate of change thereof, and
  means for supplying said pitch rate signal to said utilization apparatus whereby to inhibit oscillations of the pitch attitude of said aircraft when controlled in accordance with said utilization apparatus.

11. In an airspeed control system for aircraft, apparatus for supplying a signal representative of thrust minus drag over weight ratio comprising
  accelerometer means for providing first and second signals proportional respectively to the components of acceleration of said aircraft along its longitudinal and normal axes,
  means providing a third signal proportional to the angle of attack of said aircraft,
  means for supplying an output signal in accordance with the difference between said first signal and the product of said second and third signals, said output signal corresponding to said thrust minus drag over weight ratio, and
  indicator means responsive to said output signal for displaying an indication of the flight path angle to be attained by said aircraft during unaccelerated flight thereof.

12. The apparatus as set forth in claim 11 further including
  means for providing a control signal in accordance with the difference between a reference airspeed and the actual airspeed of said aircraft,
  means for supplying a signal in accordance with the acceleration of said craft along its flight path,
  variable limiting means responsive to said control signal and said flight path acceleration signal,
  means responsive to the output of said limiting means and adapted for controlling the airspeed of said aircraft, and
  means responsive to said thrust minus drag over weight output signal for controlling said limiting means in accordance therewith whereby to limit the acceleration of said aircraft to said reference airspeed as a function of said thrust minus drag over weight ratio.

13. Apparatus by means of which an aircraft having discretely positionable wing surfaces for varying the lift characteristics thereof may be controlled to approach and maintain a desired airspeed consistent with a safe stall margin for each surface position comprising,
  airspeed responsive means for providing a first signal corresponding to the actual airspeed of said aircraft,
  manually operable means for selecting a reference airspeed and providing a second signal corresponding thereto and including a limiting means to limit said reference airspeed signal to values consistent with safe stall margins,
  computer means for providing a third signal corresponding to a minimum safe airspeed above stall for said aircraft lift characteristics,
  means for controlling said limiting means in accordance with the value of said third signal, and
  utilization means responsive to said first, second, and third signals for controlling the airspeed of said aircraft.

14. The apparatus as set forth in claim 13 further including asymmetrical limiter means responsive to said second and third signals for limiting the commanded change in airspeed to a lesser extent for increasing commanded airspeeds than for decreasing commanded airspeeds.

15. The apparatus as set forth in claim 13 further including means responsive to the maximum desired thrust condition of said engines of said aircraft, and
  means responsive to a predetermined value of the difference between said second and third signals and said first signal for interrupting said control signal to said utilization means for controlling said utilization means in accordance with said engine condition responsive means.

16. The apparatus as set forth in claim 13 wherein said third signal computer means includes
  means for supplying a signal corresponding to the actual weight of said aircraft,
  means for supplying a signal corresponding to said variable lift characteristic, and
  means for combining said weight and lift characteristic signal for supplying said third signal.

17. The apparatus as set forth in claim 16, wherein said means for supplying said weight signal comprises,
  means for supplying a signal corresponding to the actual coefficient of lift of said aircraft,
  means for supplying a signal corresponding to the lift-over-weight ratio of said aircraft,
  means for supplying a signal corresponding to the actual airspeed of said craft, and
  means for deriving said weight signal as a function of said coefficient of lift, airspeed and lift-over-weight ratio signals.

18. In an airspeed control system for aircraft for providing a signal proportional to the weight of said aircraft comprising,
  accelerometer means for providing signals respectively proportional to the components of the total acceleration acting on said aircraft along its longitudinal and normal axes,
  means supplying a signal proportional to the angle of attack of said aircraft,
  means supplying signals proportional to movement of surfaces which affect the coefficient of lift of said aircraft, means responsive to said angle of attack and surface movement signals for supplying a signal proportional to the actual coefficient of lift of said aircraft, means responsive to both of said acceleration signals, said angle of attack signal and said coefficient of lift signal for providing a signal proportional to the lift-over-weight ratio of said aircraft, means responsive to the airspeed of said aircraft for supplying a signal in accordance therewith, and means for combining said coefficient of lift, airspeed and lift-over-weight ratio signals for providing an output signal proportional to aircraft weight.

19. An angle of attack computer for aircraft comprising first computer means responsive to sources of signals proportional respectively to accelerations of said aircraft along the longitudinal and normal axes of said aircraft, the acceleration of said aircraft along its flight path, and the aircraft flight path angle for providing an initial angle of attack signal including accurate long term components and dynamic error components due to source signal dynamic characteristics under long term and dynamic flight regimes of said aircraft, second computer means responsive to said initial angle of attack signal for providing a signal proportional to the computed weight of said aircraft and having both dynamic and steady state components, the actual weight of said aircraft varying only slowly whereby said dynamic components are inherently due to said dynamics error components, means responsive to said weight signal for providing a weight error signal including essentially only said dynamic components, and means for supplying said weight error signal in feedback fashion to said first computer means for correcting said dynamic error components of said initial angle of attack signal whereby to provide a final angle of attack signal accurate under both steady state and dynamic flight regimes.

20. The apparatus as set forth in claim 19 wherein said source of the signal proportional to the acceleration of said craft along its flight path includes further computer means comprising means responsive to said longitudinal and normal axes acceleration signals, a signal corresponding to craft airspeed and a signal corresponding to the pitch attitude of said craft for providing an output signal representative of said flight path acceleration and including steady state and short term components, said short term components including dynamics error components due to said accelerometer and pitch attitude signals, wash out filter means for providing a filtered signal including essentially only said short term components, means responsive to said filter signal and said weight error feedback signal for suppressing said dynamic error components and supplying an output signal proportional to said flight path acceleration.

21. The apparatus as set forth in claim 20 further including means responsive to said longitudinal and normal axes acceleration signals and said final angle of attack signal for supplying a signal proportional to the thrust minus drag over weight of said aircraft, and means responsive to the difference between said thrust minus drag over weight signal and said flight path acceleration signal for providing a signal proportional to the flight path angle of said aircraft.

22. The apparatus as set forth in claim 19 wherein said sources of the signal proportional to the flight path angle of said aircraft includes further computer means comprising, means responsive to a signal corresponding to the rate of change of altitude of said aircraft, said altitude rate signal including short term error components due to changes in craft pitch attitude, and to a signal corresponding to the Mach number speed of said aircraft for providing a flight path angle signal, lag filter means responsive to said altitude rate signal, and means responsive to said flight path angle signal and said weight error feedback signal for suppressing any dynamics error components of said flight path angle signal introduced by said filter means.

23. The apparatus as set forth in claim 19 wherein said second computer means comprises, means responsive to said angle of attack signal for supplying a signal corresponding to the coefficient of lift of said aircraft, means responsive to said coefficient of lift signal for supplying a signal corresponding to the ratio of the coefficient of drag to the coefficient of lift, means responsive to said normal axis acceleration signal, said angle of attack signal and said coefficient of drag and coefficient of lift ratio signal for supplying a signal corresponding to the lift over weight ratio of said aircraft, and means responsive to said coefficient of lift and lift over weight ratio signals for supplying said aircraft weight signal.

24. The apparatus as set forth in claim 19 wherein said means for supplying said weight error signal comprises, filter means responsive to said weight signal for supplying a signal including essentially only the long term components thereof, and means responsive to said weight signal and the output of said filter means for supplying a signal proportional to the difference therebetween, said difference signal corresponding essentially only to the rate of change of said weight signal and constituting said weight error signal.

25. The apparatus as set forth in claim 24 further including means for limiting the gain of said weight error feedback signal to a predetermined low value whereby to assure accurate response of said weight computer to normal gradual changes in aircraft weight.

26. The apparatus as set forth in claim 24 further including means responsive to said weight error feedback signal for controlling the gain thereof, and means for varying the output of the weight signal means in accordance with predetermined known abrupt changes in the weight of said craft.

27. The apparatus as set forth in claim 24 wherein the normal time constant of said weight signal filter means is on the order of 200 to 500 seconds.

28. The apparatus as set forth in claim 27 further including lift off detector for changing the time constant of said weight filter means to a small fraction of said normal value during the take-off roll whereby to provide rapid up-dating of said weight signal, and for establishing said normal time constant as the weight of the aircraft is transferred to its lifting surfaces.

29. The apparatus as set forth in claim 28 wherein said lift off detector means comprises means responsive to a predetermined value of the pitch attitude of said aircraft.

30. Apparatus for computing the value of an aircraft flight control parameter from sources of primary data which have desirable accuracy characteristics in long term flight regimes but undesirable error characteristics in dynamic flight regimes, the combination comprising, first computer means responsive to said primary data sources for computing an initial value of said parameter including said accurate long term components and said dynamic error components, second computer means responsive to the output of said first computer means for computing the value of a related aircraft parameter which inherently varies only slowly under all flight regimes, whereby any dynamic components in the output of said second computer results from the dynamic error components in the output of said first computer means, means responsive to the output of said second computer means for providing an output including only said dynamic error components, and means for supplying the output of said last mentioned means in feedback fashion to said first computer means for correcting said dynamic error components of said initial value of said parameter whereby to provide a final value of said parameter under both said steady-state and dynamic flight regimes.

31. Apparatus for computing the airborne weight of an aircraft at lift off thereof from a runway comprising, means for supplying a signal corresponding to a predetermined coefficient of lift at a predetermined lift off pitch attitude, means for supplying a signal corresponding to the airborne coefficient of lift of said aircraft, means for supplying signals corresponding to the airborne lift over weight ratio of said aircraft, and, to the speed of said aircraft, weight computer means selectively responsive to said airborne coefficient of lift signal and said predetermined coefficient of lift signal and to said lift over weight ratio and airspeed signals, and including filter means having selectable long term and short term time constants for supplying an output signal corresponding to the lift off weight of said aircraft, lift off detector means responsive to said predetermined lift off pitch attitude of said aircraft for rendering said weight computer means responsive to said predetermined coefficient of lift signal and said short term filter time constant during the take off ground roll and to said airborne coefficient of lift signal and said long filter time constant at lift off, and feedback means responsive to said computed weight signal for correcting said airborne coefficient of lift signal.

* * * * *